US007852298B2

(12) United States Patent
Nathan et al.

(10) Patent No.: US 7,852,298 B2
(45) Date of Patent: Dec. 14, 2010

(54) METHOD AND SYSTEM FOR DRIVING A LIGHT EMITTING DEVICE DISPLAY

(75) Inventors: Arokia Nathan, Waterloo (CA); G. Reza Chaji, Waterloo (CA)

(73) Assignee: Ignis Innovation Inc., Kitchener, Ontario (CA)

( * ) Notice: Subject to any disclaimer, the term of this patent is extended or adjusted under 35 U.S.C. 154(b) by 1051 days.

(21) Appl. No.: 11/449,487

(22) Filed: Jun. 8, 2006

(65) Prior Publication Data

US 2006/0290614 A1 Dec. 28, 2006

(30) Foreign Application Priority Data

Jun. 8, 2005 (CA) .................................... 2508972
Feb. 20, 2006 (CA) .................................... 2537173
Apr. 10, 2006 (CA) .................................... 2542678

(51) Int. Cl.
*G09G 3/30* (2006.01)
*G06F 3/038* (2006.01)

(52) U.S. Cl. ........................................ 345/78; 345/204

(58) Field of Classification Search ............. 345/76–77, 345/82–83, 89, 169.3, 176–183, 204, 55–103, 345/78
See application file for complete search history.

(56) References Cited

U.S. PATENT DOCUMENTS 5,701,505 A 12/1997 Yamashita et al.
5,758,129 A 5/1998 Gray et al.
6,396,469 B1 * 5/2002 Miwa et al. .................. 345/87
6,414,661 B1 7/2002 Shen et al.
6,433,488 B1 8/2002 Bu
6,473,065 B1 10/2002 Fan
6,501,466 B1 12/2002 Yamagishi et al.
6,535,185 B2 3/2003 Kim et al.
6,618,030 B2 9/2003 Kane et al.
6,686,699 B2 * 2/2004 Yumoto .................. 315/169.3
6,788,231 B1 9/2004 Hsueh
6,809,706 B2 10/2004 Shimoda
6,859,193 B1 * 2/2005 Yumoto ....................... 345/82
7,038,392 B2 5/2006 Libsch et al.
7,071,932 B2 * 7/2006 Libsch et al. .............. 345/211

(Continued)

FOREIGN PATENT DOCUMENTS

CA 2507276 8/2002

(Continued)

OTHER PUBLICATIONS

Alexander et al.: "Pixel circuits and drive schemes for glass and elastic AMOLED displays"; dated Jul. 2005 (9 pages).

(Continued)

*Primary Examiner*—Bipin Shalwala
*Assistant Examiner*—Sosina Abebe
(74) *Attorney, Agent, or Firm*—Nixon Peabody LLP

(57) ABSTRACT

A method and system for driving a light emitting device display is provided. The system provides a timing schedule which increases accuracy in the display. The system may provide the timing schedule by which an operation cycle is implemented consecutively in a group of rows. The system may provide the timing schedule by which an aging factor is used for a plurality of frames.

16 Claims, 22 Drawing Sheets

U.S. PATENT DOCUMENTS

| | | | | |
|---|---|---|---|---|
| 7,259,737 | B2 * | 8/2007 | Ono et al. | 345/82 |
| 7,262,753 | B2 * | 8/2007 | Tanghe et al. | 345/82 |
| 7,317,434 | B2 | 1/2008 | Lan et al. | |
| 7,327,357 | B2 | 2/2008 | Jeong | |
| 2002/0195968 | A1 | 12/2002 | Sanford et al. | |
| 2003/0112205 | A1 | 6/2003 | Yamada | |
| 2003/0112208 | A1 | 6/2003 | Okabe | |
| 2003/0156104 | A1 | 8/2003 | Morita | |
| 2004/0004589 | A1 | 1/2004 | Shih | |
| 2004/0041750 | A1 | 3/2004 | Abe | |
| 2004/0129933 | A1 | 7/2004 | Nathan et al. | |
| 2004/0174349 | A1 | 9/2004 | Libsch et al. | |
| 2005/0057459 | A1 | 3/2005 | Miyazawa | |
| 2006/0125408 | A1 | 6/2006 | Nathan et al. | |
| 2006/0290614 | A1 * | 12/2006 | Nathan et al. | 345/76 |
| 2007/0063932 | A1 | 3/2007 | Nathan et al. | |
| 2007/0085801 | A1 | 4/2007 | Park et al. | |
| 2007/0236430 | A1 | 10/2007 | Fish | |
| 2008/0048951 | A1 | 2/2008 | Naugler et al. | |

FOREIGN PATENT DOCUMENTS

| | | |
|---|---|---|
| CA | 2463653 | 1/2004 |
| CA | 2443206 | 3/2005 |
| CA | 2519097 | 3/2005 |
| CA | 2523841 | 1/2006 |
| CA | 2557713 | 11/2006 |
| EP | 1 473 689 A | 11/2004 |

OTHER PUBLICATIONS

Chaji et al.: "A fast settling current driver based on the CCII for AMOLED displays"; dated Dec. 2009 (6 pages).
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel circuit based on short-term stress stability of a-Si:H TFTs"; dated Oct. 2005 (3 pages).
Chaji et al.: "A Novel Driving Scheme and Pixel Circuit for AMOLED Displays"; dated Jun. 2006 (4 pages).
Chaji et al.: "A novel driving scheme for high-resolution large-area a-Si:H AMOLED displays"; dated Aug. 2005 (4 pages).
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "eUTDSP: a design study of a new VLIW-based DSP architecture"; dated My 2003 (4 pages).
Chaji et al.: "High Speed Low Power Adder Design With a New Logic Style: Pseudo Dynamic Logic (SDL)"; dated Oct. 2001 (4 pages).
Chaji et al.: "Low-Cost Stable a-Si:H AMOLED Display for Portable Applications"; dated Jun. 2006 (4 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
International Search Report for International Application No. PCT/CA2006/000941 dated Oct. 3, 2006 (2 pages).
Jafarabadiashtiani et al.: "A New Driving Method for a-Si AMOLED Displays Based on Voltage Feedback"; dated 2005 (4 pages).
Lee et al.: "Ambipolar Thin-Film Transistors Fabricated by PECVD Nanocrystalline Silicon"; dated 2006 (6 pages).
Matsueda y et al.: "35.1: 2.5-in. AMOLED with Integrated 6-bit Gamma Compensated Digital Data Driver"; dated May 2004.
Nathan et al.: "Backplane Requirements for Active Matrix Organic Light Emitting Diode Displays"; dated 2006 (16 pages).
Nathan et al.: "Driving schemes for a-Si and LTPS AMOLED displays"; dated Dec. 2005 (11 pages).
Nathan et al.: "Invited Paper: a -Si for AMOLED - Meeting the Performance and Cost Demands of Display Applications (Cell Phone to HDTV)"; dated 2006 (4 pages).
Philipp: "Charge transfer sensing" SENSOR REVIEW, vol. 19, No. 2, Dec. 31, 1999, 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).

* cited by examiner

METHOD AND SYSTEM FOR DRIVING A LIGHT EMITTING DEVICE DISPLAY

FIELD OF INVENTION

The present invention relates to display technologies, more specifically a method and system for driving light emitting device displays.

BACKGROUND OF THE INVENTION

Recently active-matrix organic light-emitting diode (AMOLED) displays with amorphous silicon (a-Si), poly-silicon, organic, or other driving backplane have become more attractive due to advantages over active matrix liquid crystal displays. An AMOLED display using a-Si backplanes, for example, has the advantages that include low temperature fabrication that broadens the use of different substrates and makes flexible displays feasible, and its low cost fabrication. Also, OLED yields high resolution displays with a wide viewing angle.

The AMOLED display includes an array of rows and columns of pixels, each having an organic light-emitting diode (OLED) and backplane electronics arranged in the array of rows and columns. Since the OLED is a current driven device, the pixel circuit of the AMOLED should be capable of providing an accurate and constant drive current.

FIG. 1 illustrates conventional operation cycles for a conventional voltage-programmed AMOLED display. In FIG. 1, "Rowi" (i=1, 2, 3) represents a ith row of the matrix pixel array of the AMOLED display. In FIG. 1, "C" represents a compensation voltage generation cycle in which a compensation voltage is developed across the gate-source terminal of a drive transistor of the pixel circuit, "VT-GEN" represents a $V_T$-generation cycle in which the threshold voltage of the drive transistor, $V_T$, is generated, "P" represents a current-regulation cycle where the pixel current is regulated by applying a programming voltage to the gate of the drive transistor, and "D" represents a driving cycle in which the OLED of the pixel circuit is driven by current controlled by the drive transistor.

For each row of the AMOLED display, the operating cycles include the compensation voltage generation cycle "C", the $V_T$-generation cycle "VT-GEN", the current-regulation cycle "P", and the driving cycle "D". Typically, these operating cycles are performed sequentially for a matrix structure, as shown in FIG. 1. For example, the entire programming cycles (i.e., "C", "VT-GEN", and "P") of the first row (i.e., $Row_1$) are executed, and then the second row (i.e., $Row_2$) is programmed.

However, since the $V_T$-generation cycle "VT-GEN" requires a large timing budget to generate an accurate threshold voltage of a drive TFT, this timing schedule cannot be adopted in large-area displays. Moreover, executing two extra operating cycles (i.e., "C" and "VT-GEN") results in higher power consumption and also requires extra controlling signals leading to higher implementation cost.

SUMMARY OF THE INVENTION

It is an object of the invention to provide a method and system that obviates or mitigates at least one of the disadvantages of existing systems.

In accordance with an aspect of the present invention there is provided a display system which includes: a pixel array including a plurality of pixel circuits arranged in row and column. The pixel circuit has a light emitting device, a capacitor, a switch transistor and a drive transistor for driving the light emitting device. The pixel circuit includes a path for programming, and a second path for generating the threshold of the drive transistor. The system includes: a first driver for providing data for the programming to the pixel array; and a second driver for controlling the generation of the threshold of the drive transistor for one or more drive transistors. The first driver and the second driver drives the pixel array to implement the programming and generation operations independently.

In accordance with a further aspect of the present invention there is provided a method of driving a display system. The display system includes: a pixel array including a plurality of pixel circuits arranged in row and column. The pixel circuit has a light emitting device, a capacitor, a switch transistor and a drive transistor for driving the light emitting device. The pixel circuit includes a path for programming, and a second path for generating the threshold of the drive transistor. The method includes the steps of: controlling the generation of the threshold of the drive transistor for one or more drive transistors, providing data for the programming to the pixel array, independently from the step of controlling.

In accordance with a further aspect of the present invention there is provided a display system which includes: a pixel array including a plurality of pixel circuits arranged in row and column, The pixel circuit has a light emitting device, a capacitor, a switch transistor and a drive transistor for driving the light emitting device. The system includes: a first driver for providing data to the pixel array for programming; and a second driver for generating and storing an aging factor of each pixel circuit in a row into the corresponding pixel circuit, and programming and driving the pixel circuit in the row for a plurality of frames based on the stored aging factor. The pixel array is divided into a plurality of segments. At least one of signal lines driven by the second driver for generating the aging factor is shared in a segment.

In accordance with a further aspect of the present invention there is provided a method of driving a display system. The display system includes: a pixel array including a plurality of pixel circuits arranged in row and column. The pixel circuit has a light emitting device, a capacitor, a switch transistor and a drive transistor for driving the light emitting device. The pixel array is divided into a plurality of segments. The method includes the steps of: generating an aging factor of each pixel circuit using a segment signal and storing the aging factor into the corresponding pixel circuit for each row, the segment signal being shared by each segment; and programming and driving the pixel circuit in the row for a plurality of frames based on the stored aging factor.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Embodiments of the present invention are described using a pixel circuit having a light emitting device, such as an organic light emitting diode (OLED), and a plurality of transistors, such as thin film transistors (TFTs), arranged in row and column, which form an AMOLED display. The pixel circuit may include a pixel driver for OLED. However, the pixel may include any light emitting device other than OLED, and the pixel may include any transistors other than TFTs. The transistors in the pixel circuit may be n-type transistors, p-type transistors or combinations thereof. The transistors in the pixel may be fabricated using amorphous silicon, nano/micro crystalline silicon, poly silicon, organic semiconductors technologies (e.g. organic TFT), NMOS/PMOS technology or CMOS technology (e.g. MOSFET). In the description, "pixel circuit" and "pixel" may be used interchangeably. The pixel circuit may be a current-programmed pixel or a voltage-programmed pixel. In the description below, "signal" and "line" may be used interchangeably.

The embodiments of the present invention involve a technique for generating an accurate threshold voltage of a drive TFT. As a result, it generates a stable current despite the shift of the characteristics of pixel elements due to, for example, the pixel aging, and process variation. It enhances the brightness stability of the OLED. Also it may reduce the power consumption and signals, resulting in low implementation cost.

A segmented timing schedule and a parallel timing schedule are described in detail. These schedules extend the timing budget of a cycle for generating the threshold voltage $V_T$ of a drive transistor. As described below, the rows in a display array are segmented and the operating cycles are divided into a plurality of categories, e,g., two categories. For example, the first category includes a compensation cycle and a $V_T$-generation cycle, while the second category includes a current-regulation cycle and a driving cycle. The operating cycles for each category are performed sequentially for each segment, while the two categories are executed for two adjacent segments. For example, while the current regulation and driving cycles are performed for the first segment sequentially, the compensation and $V_T$-generation cycles are executed for the second segment.

Figure 1:
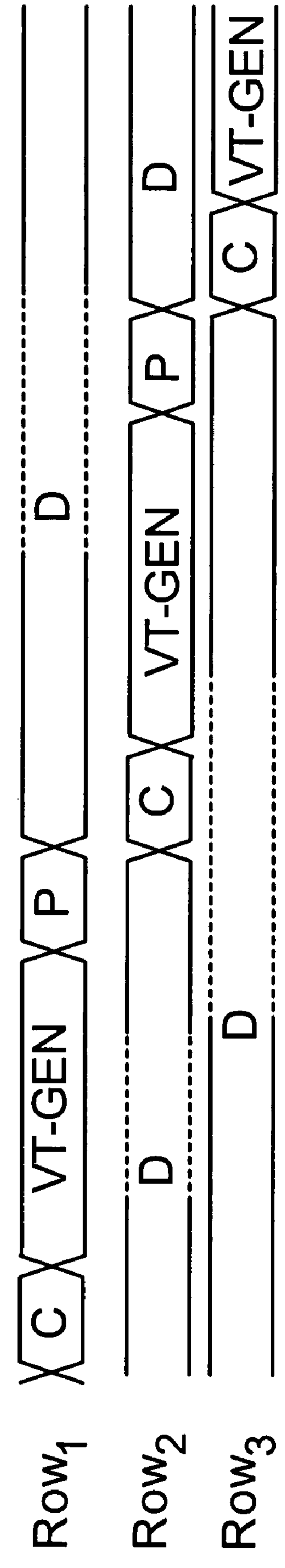
FIG. 1 illustrates conventional operating cycles for a conventional AMOLED display.
Figure 2:
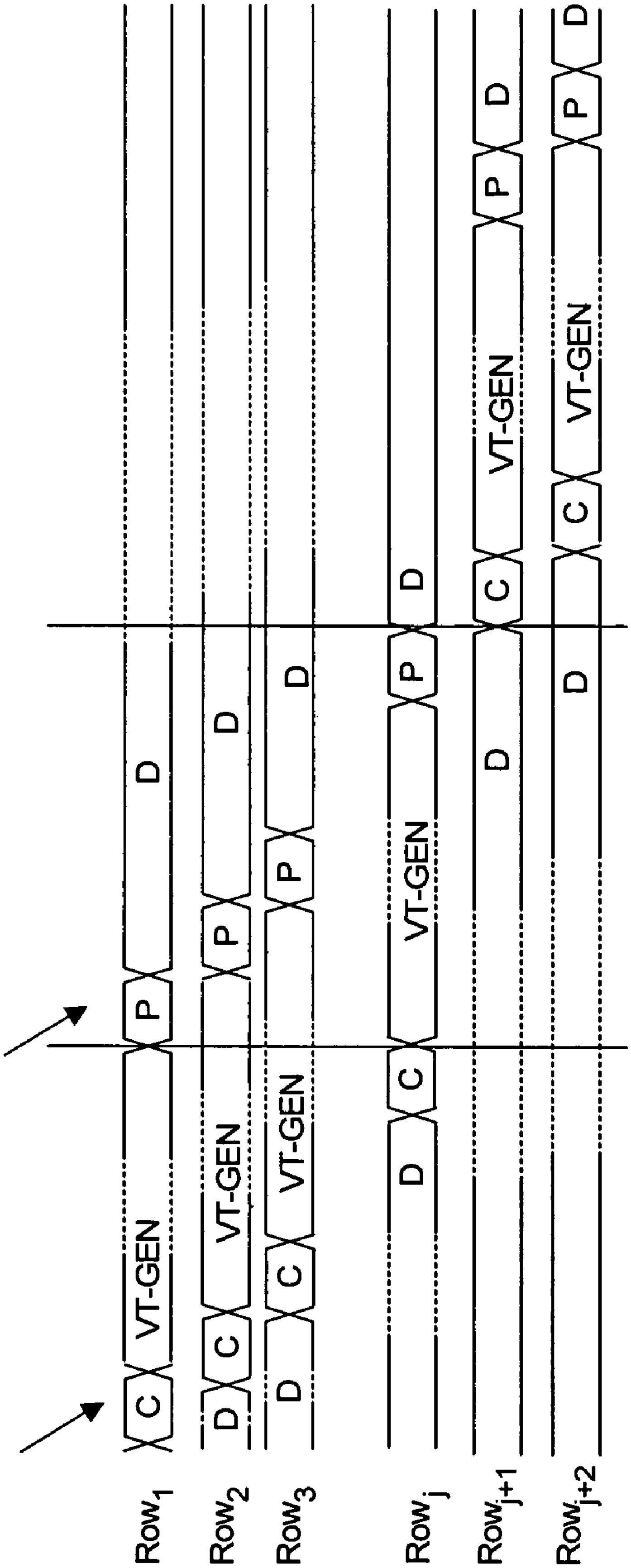
FIG. 2 illustrates an example of a segmented timing schedule for stable operation of a light emitting light display, in accordance with an embodiment of the present invention.

FIG. 2 illustrates an example of the segmented timing schedule for stable operation of a light emitting display, in accordance with an embodiment of the present invention. In FIG. 2, "$Row_k$" (k=1, 2, 3, . . . , j, j+1, j+2) represents a kth row of a display array, an arrow shows an execution direction.

For each row, the timing schedule of FIG. 2 includes a compensation voltage generation cycle "C", a $V_T$-generation cycle "VT-GEN", a current-regulation cycle "D", and a driving cycle "P".

The timing schedule of FIG. 2 extends the timing budget of the $V_T$-generation cycle "VT-GEN" without affecting the programming time. To achieve this, the rows of the display array to which the segmented addressing scheme of FIG. 2 is applied are categorized as few segments. Each segment includes rows in which the $V_T$-generation cycle is carried out consequently. In FIG. 2, $Row_1$, $Row_2$, $Row_3$, . . . , and, $Row_j$ are in one segment in a plurality of rows of the display array.

The programming of each segment starts with executing the first and second operating cycles "C" and "VT-GEN". After that, the current-calibration cycle "P" is preformed for the entire segment. As a result, the timing budget of the $V_T$-generation cycle "VT-GEN" is extended to $j.\tau_P$ where j is the number of rows in each segment, and $\tau_P$ is the timing budget of the first operating cycle "C" (or current regulation cycle).

Also, the frame time $\tau_F$ is $Z \times n \times \tau_P$ where n is the number of rows in the display, and Z is a function of number of iteration in a segment. For example, in FIG. 2, the $V_T$ generation starts from the first row of the segment and goes to the last row (the first iteration) and then the programming starts from the first row and goes to the last row (the second iteration). Accordingly, Z is set to 2. If the number of iteration increases, the frame time will become $Z \times n \times \tau_P$ in which Z is the number of iteration and may be greater than 2.

Figure 3:
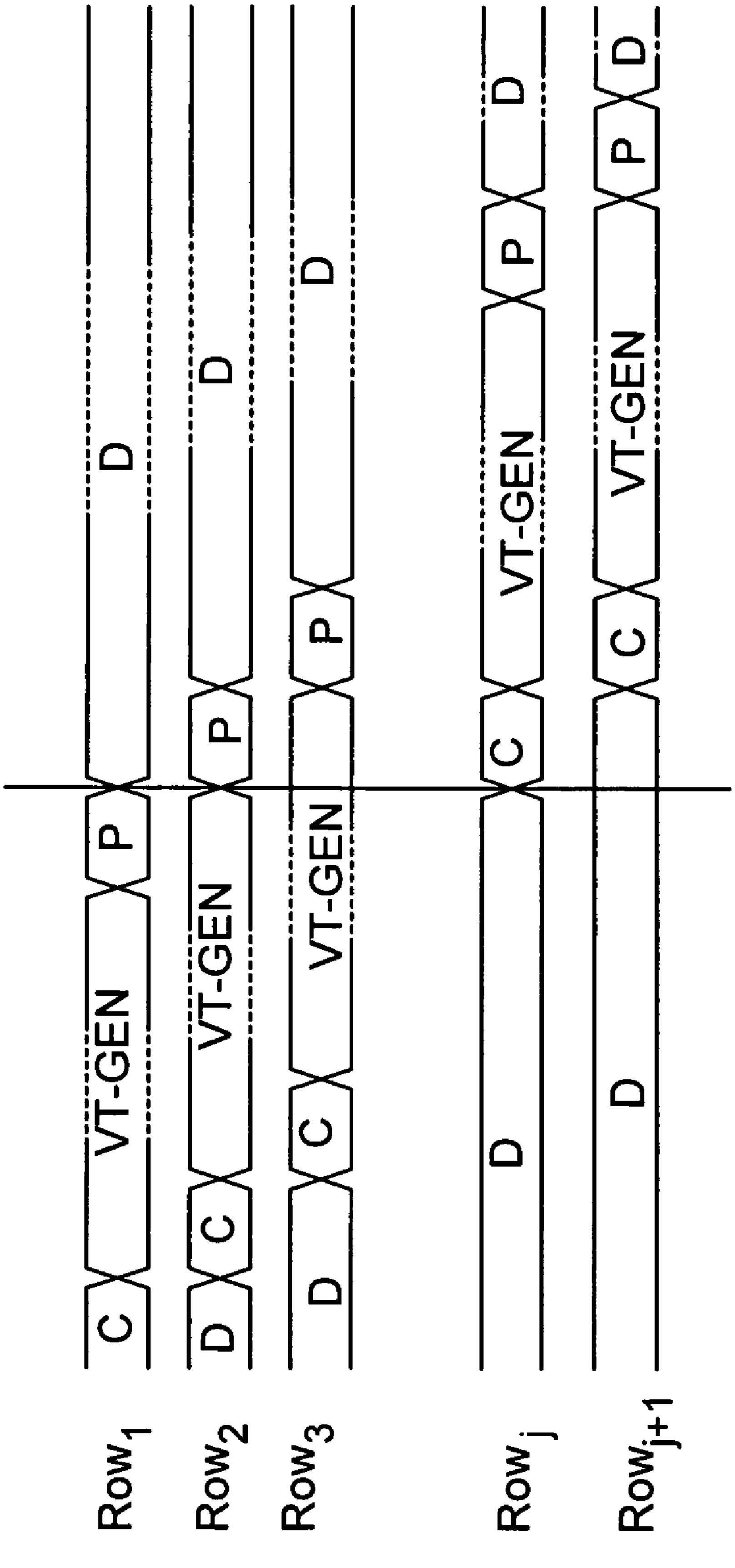
FIG. 3 illustrates an example of a parallel timing schedule for stable operation of a light emitting light display, in accordance with an embodiment of the present invention.

FIG. 3 illustrates an example of the parallel timing schedule for stable operation of a light emitting light display, in accordance with an embodiment of the present invention. In FIG. 3, "$Row_k$" (k=1, 2, 3, . . . , j, j+1) represents a kth row of a display array.

Figure 4:
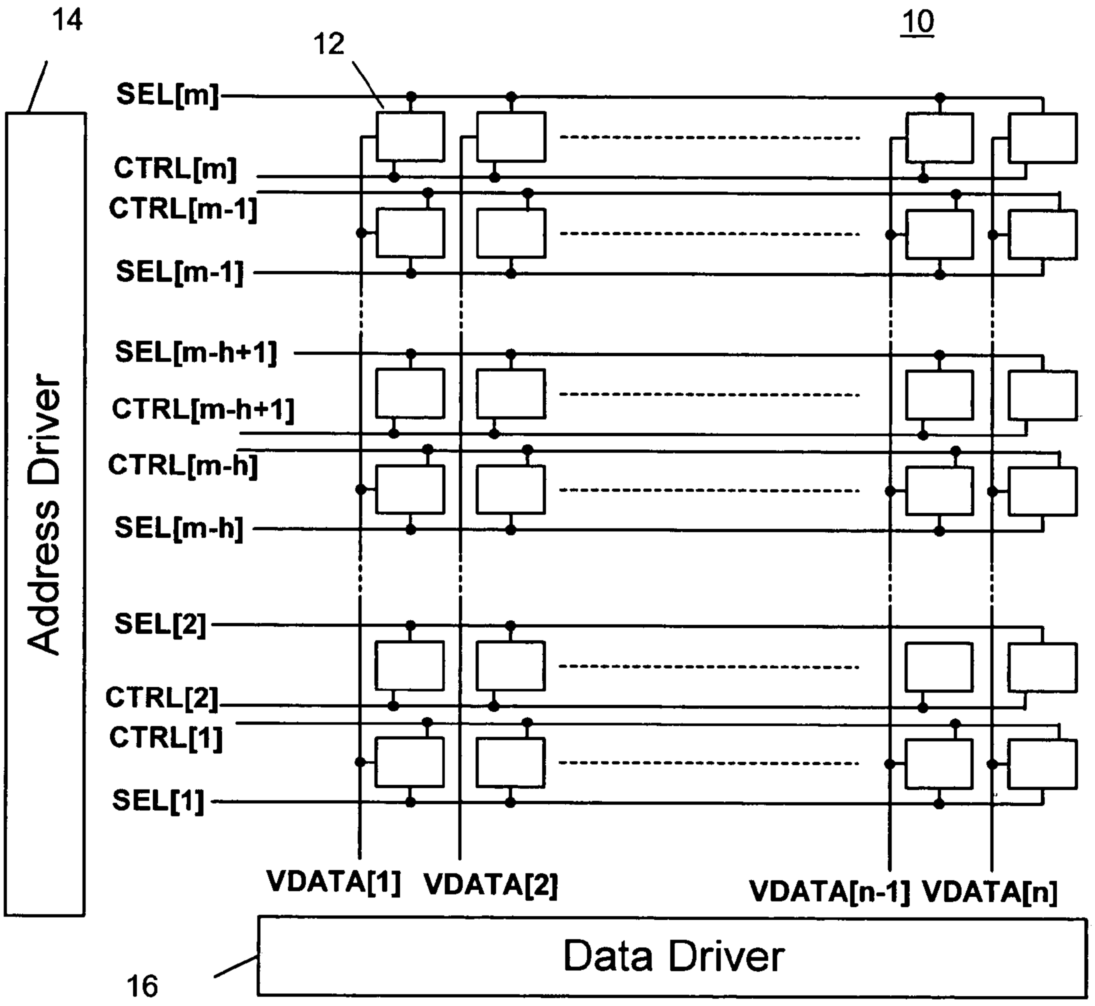
FIG. 4 illustrates an example of an AMOLED display array structure for the timing schedules of FIGS. 2 and 3.

Similar to FIG. 2, the timing schedule of FIG. 4 includes the compensation voltage generation cycle "C", the $V_T$-generation cycle "VT-GEN", the current-regulation cycle "P", and the driving cycle "D", for each row.

The timing schedule of FIG. 3 extends the timing budget of the $V_T$-generation cycle "VT-GEN", whereas $\tau_P$ is preserved as $\tau_F/n$, where $\tau_P$ is the timing budget of the first operating cycle "C", $\tau_F$ is a frame time, and n is the number of rows in the display array. In FIG. 3, $Row_1$ to $Row_j$ are in a segment in a plurality of rows of the display array.

According to the above addressing scheme, the current-regulation cycle "P" of each segment is preformed in parallel with the first operating cycles "C" of the next segment. Thus, the display array is designed to support the parallel operation, i.e., having capability of carrying out different cycles independently without affecting each other, e.g., compensation and programming, $V_T$-generation and current regulation.

FIG. 4 illustrates an example of an example of an AMOLED display array structure for the timing schedules of FIGS. 2 and 3. In FIG. 4, SEL[a] (a=1, . . . , m) represents a select signal to select a row, CTRL[b] (b=1, . . . , m) represents a controlling signal to generate the threshold voltage of the drive TFT at each pixel in the row, and VDATA[c] (c=1, . . . , n) represents a data signal to provide a programming data. The AMOLED display 10 of FIG. 4 includes a plurality of pixel circuits 12 which are arranged in row and column, an address driver 14 for controlling SEL[a] and CTRL[b], and a data driver 16 for controlling VDATA[c]. The rows of the pixel circuits 12 (e.g., $Row_1$, . . . , $Row_{m-h}$ and $Row_{m-h+1}$, . . . , $Row_m$) are segmented as described above. To implement certain cycles in parallel, the AMOLED display 10 is designed to support the parallel operation.

Figure 5:
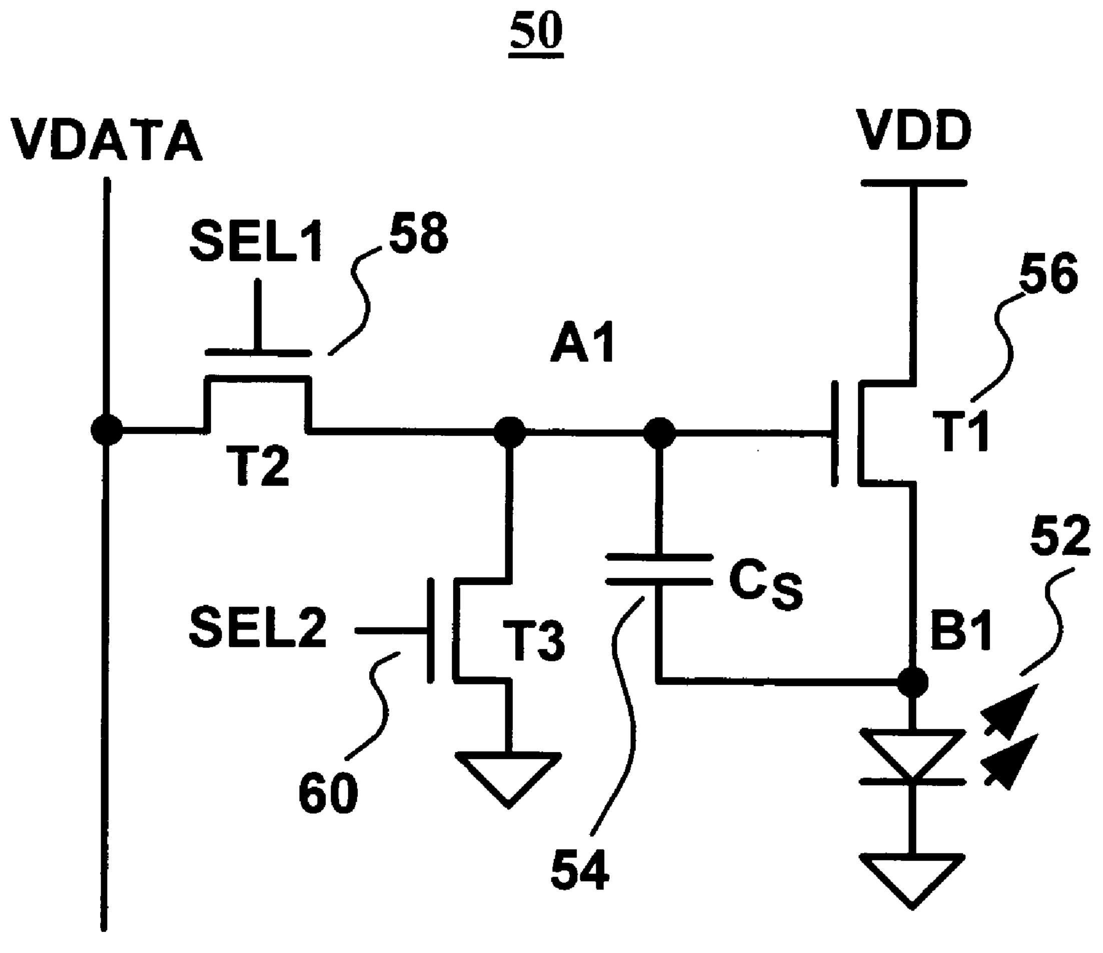
FIG. 5 illustrates an example of a voltage programmed pixel circuit to which the segmented timing schedule and the parallel timing schedule are applicable.

FIG. 5 illustrates an example of a pixel circuit to the segmented timing schedule and parallel timing schedule are applicable. The pixel circuit 50 of FIG. 5 includes an OLED 52, a storage capacitor 54, a drive TFT 56, and switch TFTs 58 and 60. A select line SEL1 is connected to the gate terminal of the switch TFT 58. A select line SEL2 is connected to the gate terminal of the switch TFT 60. The first terminal of the switch TFT 58 is connected to a data line VDATA, and the second terminal of the switch TFT 58 is connected to the gate of the drive TFT 56 at node A1. The first terminal of the switch TFT 60 is connected to node A1, and the second terminal of the switch TFT 60 is connected to a ground line. The first terminal of the drive TFT 56 is connected to a controllable voltage supply VDD, and the second terminal of the drive TFT 56 is connected to the anode electrode of the OLED 52 at node B1. The first terminal of the storage capacitor 54 is connected to node A1, and the second terminal of the storage capacitor 54 is connected to node B1. The pixel circuit 50 can be used with the segmented timing schedule, the parallel timing schedule, and a combination thereof.

$V_T$-generation occurs through the transistors 56 and 60, while current regulation is performed by the transistor 58 through the VDATA line. Thus, this pixel is capable of implementing the parallel operation.

Figure 6:
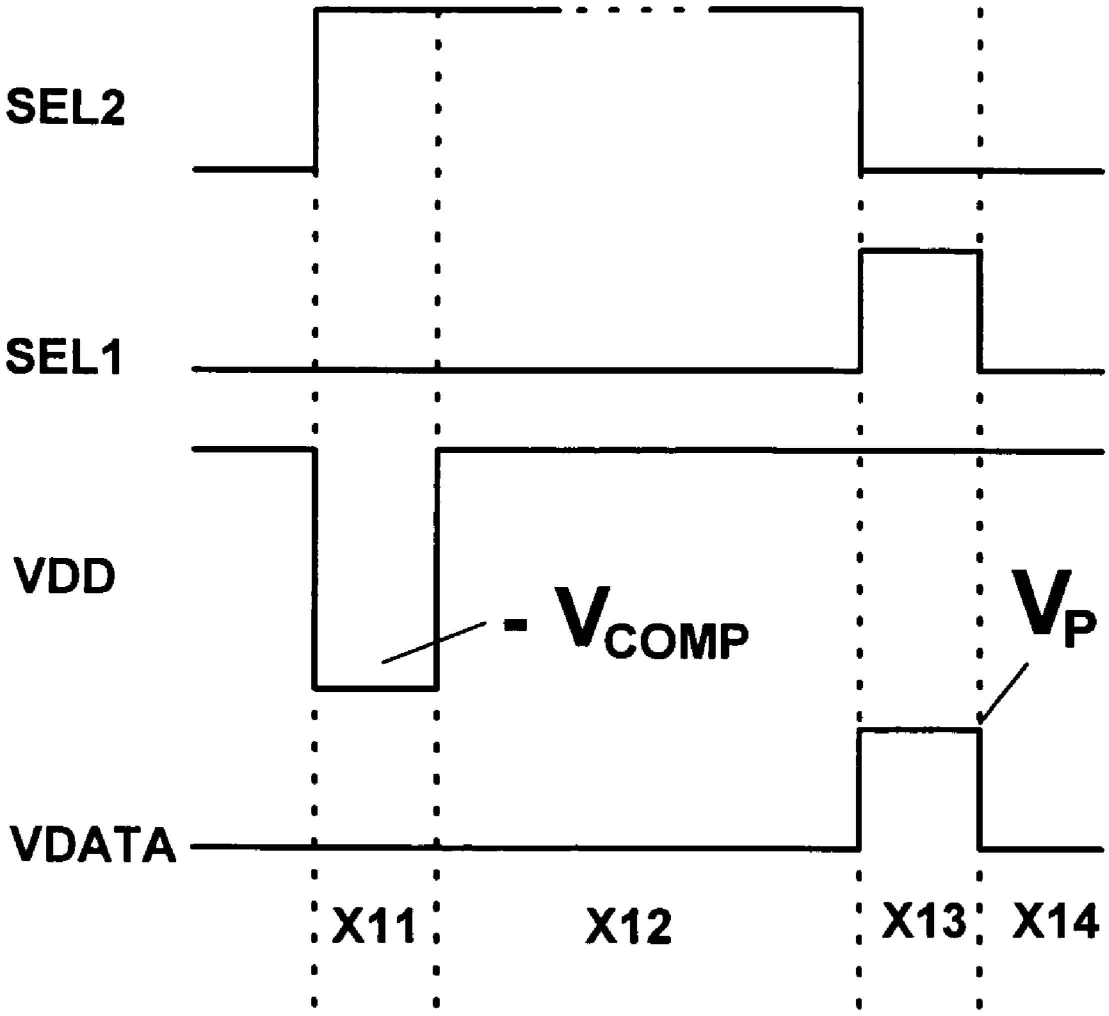
FIG. 6 illustrates an example of a timing schedule applied to the pixel circuit of FIG. 5.
Figure 7:
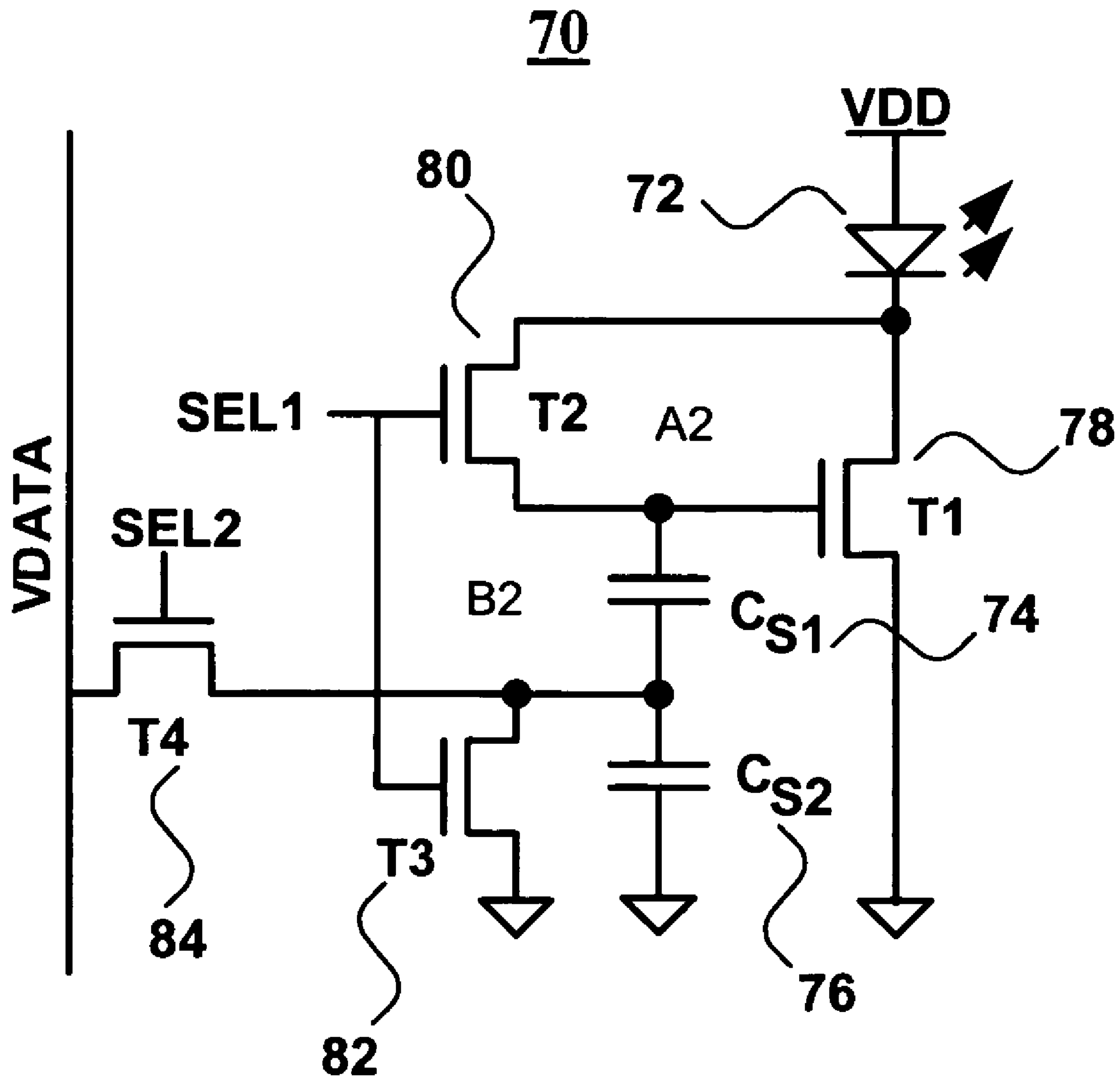
FIG. 7 illustrates another example of a voltage programmed pixel circuit to which the segmented timing schedule and the parallel timing schedule are applicable.

FIG. 6 illustrates an example of a timing schedule applied to the pixel circuit 50. In FIG. 7, "X11", "X12", "X13", and "X14" represent operating cycles. X11 corresponds to "C" of FIGS. 2 and 3, X12 corresponds to "VT-GEN" of FIGS. 2 and 3, X13 corresponds to "P" of FIGS. 2 and 3, and X14 corresponds to "D" of FIGS. 2 and 3.

Referring to FIGS. 5 and 6, the storage capacitor 54 is charged to a negative voltage (−Vcomp) during the first operating cycle X11, while the gate voltage of the drive TFT 56 is zero. During the second operating cycle X12, node B1 is charged up to −VT where $V_T$ is the threshold of the drive TFT 56. This cycle X12 can be done without affecting the data line VDATA since it is preformed through the switch transistor 60, not the switch transistor 58, so that the other operating cycle can be executed for the other rows. During the third operating cycle X13, node A1 is charged to a programming voltage $V_P$, resulting in $V_{GS}=V_P+V_T$ where $V_{GS}$ represents a gate-source voltage of the drive TFT 56.

FIG. 7 illustrates another example of a pixel circuit to the segmented timing schedule and the parallel timing schedules are applicable. The pixel circuit 70 of FIG. 7 includes an OLED 72, storage capacitors 74 and 76, a drive TFT 78, and switch TFTs 80, 82 and 84. A first select line SEL1 is connected to the gate terminal of the switch TFTs 80 and 82. A second select line SEL2 is connected to the gate terminal of the switch TFT 84. The first terminal of the switch TFT 80 is connected to the cathode of the OLED 72, and the second terminal of the switch TFT 80 is connected to the gate terminal of the drive TFT 78 at node A2. The first terminal of the switch TFT 82 is connected to node B2, and the second terminal of the switch TFT 82 is connected to a ground line. The first terminal of the switch TFT 84 is connected to a data line VDATA, and the second terminal of the switch TFT 84 is connected to node B2. The first terminal of the storage capacitor 74 is connected to node A2, and the second terminal of the storage capacitor 74 is connected to node B2. The first terminal of the storage capacitor 76 is connected to node B2, and the second terminal of the storage capacitor 76 is connected to a ground line. The first terminal of the drive TFT 78 is connected to the cathode electrode of the OLED 72, and the second terminal of the drive TFT 78 is coupled to a ground line. The anode electrode of the OLED 72 is coupled to a controllable voltage supply VDD. The pixel circuit 70 has the capability of adopting the segmented timing schedule, the parallel timing schedule, and a combination thereof.

$V_T$-generation occurs through the transistors 78, 80 and 82, while current regulation is performed by the transistor 84 through the VDATA line. Thus, this pixel is capable of implementing the parallel operation.

Figure 8:
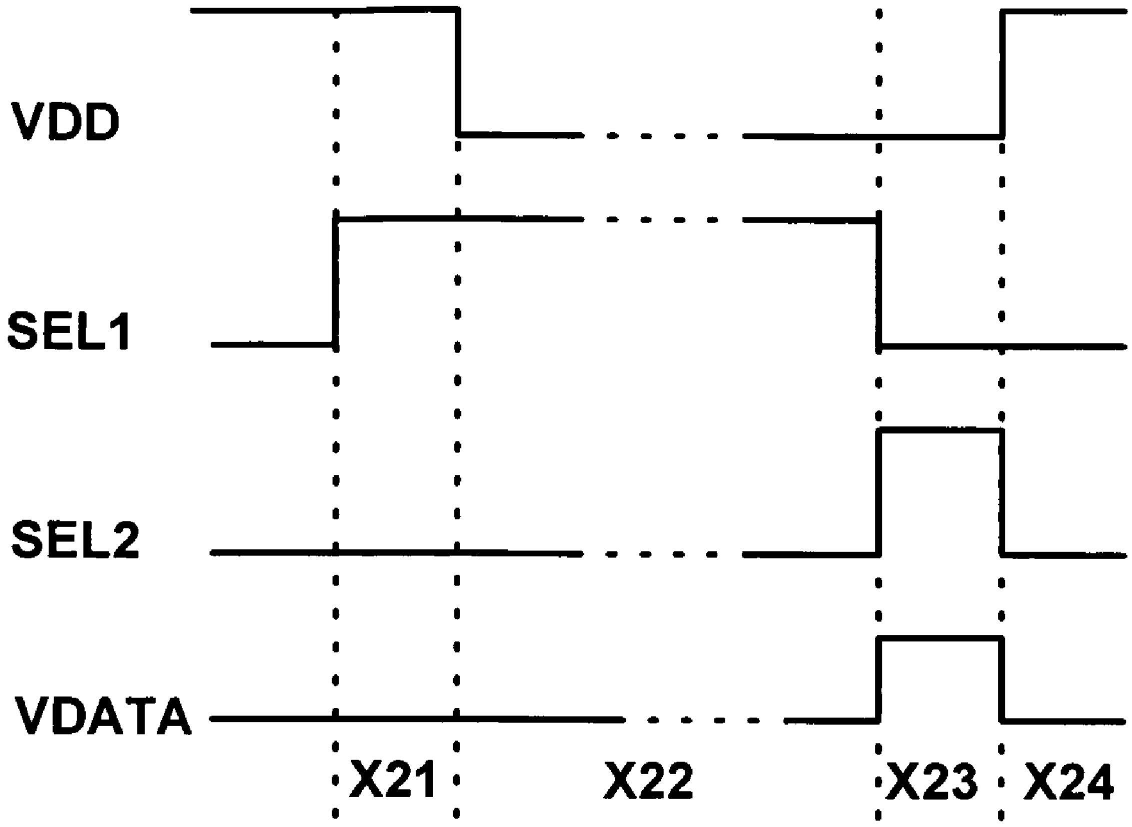
FIG. 8 illustrates an example of a timing schedule applied to the pixel circuit of FIG. 7.

FIG. 8 illustrates an example of a timing schedule applied to the pixel circuit 70. In FIG. 8, "X21", "X22", "X23", and "X24" represent operating cycles. X21 corresponds to "C" of FIGS. 2 and 3, X22 corresponds to "VT-GEN" of FIGS. 2 and 3, X23 corresponds to "P" of FIGS. 2 and 3, and X24 corresponds to "D" of FIGS. 2 and 3.

Referring to FIGS. 7 and 8, the pixel circuit 70 employs bootstrapping effect to add a programming voltage to the stored $V_T$ where $V_T$ is the threshold voltage of the drive TFT 78. During the first operating cycle x21, node A2 is charged to a compensating voltage, VDD−$V_{OLED}$ where $V_{OLED}$ is a voltage of the OLED 72, and node B2 is discharged to ground. During the second operating cycle X22, voltage at node A2 is changed to the $V_T$ of the drive TFT 78. The current regulation occurs in the third operating cycle X23 during which node B2 is charged to a programming voltage $V_P$ so that node A2 changes to $V_P+V_T$.

The segmented timing schedule and the parallel timing schedule described above provide enough time for the pixel circuit to generate an accurate threshold voltage of the drive TFT. As a result, it generates a stable current despite the pixel aging, process variation, or a combination thereof. The operating cycles are shared in a segment such that the programming cycle of a row in the segment is overlapped with the programming cycle of another row in the segment. Thus, they can maintain high display speed, regardless of the size of the display.

A shared signaling addressing scheme is described in detail. According to the shared signaling addressing scheme, the rows in the display array are divided into few segments. The aging factor (e.g., threshold voltage of the drive TFT, OLED voltage) of the pixel circuit is stored in the pixel. The stored aging factor is used for a plurality of frames. One or more signals required to generate the aging factor are shared in the segment.

For example, the threshold voltage $V_T$ of the drive TFT is generated for each segment at the same time. After that, the segment is put on the normal operation. All extra signals besides the data line and select line required to generate the threshold voltage (e.g., VSS of FIG. 10) are shared between the rows in each segment. Considering that the leakage current of the TFT is small, using a reasonable storage capacitor to store the $V_T$ results in less frequent compensation cycle. As a result, the power consumption reduces dramatically.

Since the $V_T$-generation cycle is carried out for each segment, the time assigned to the $V_T$-generation cycle is extended by the number of rows in a segment leading to more precise compensation. Since the leakage current of a-Si: TFTs is small (e.g., the order of $10^{-14}$), the generated $V_T$ can be stored in a capacitor and be used for several other frames. As a result, the operating cycles during the next post-compensation frames are reduced to the programming and driving cycles. Consequently, the power consumption associated with the external driver and with charging/discharging the parasitic capacitances is divided between the same few frames.

Figure 9:
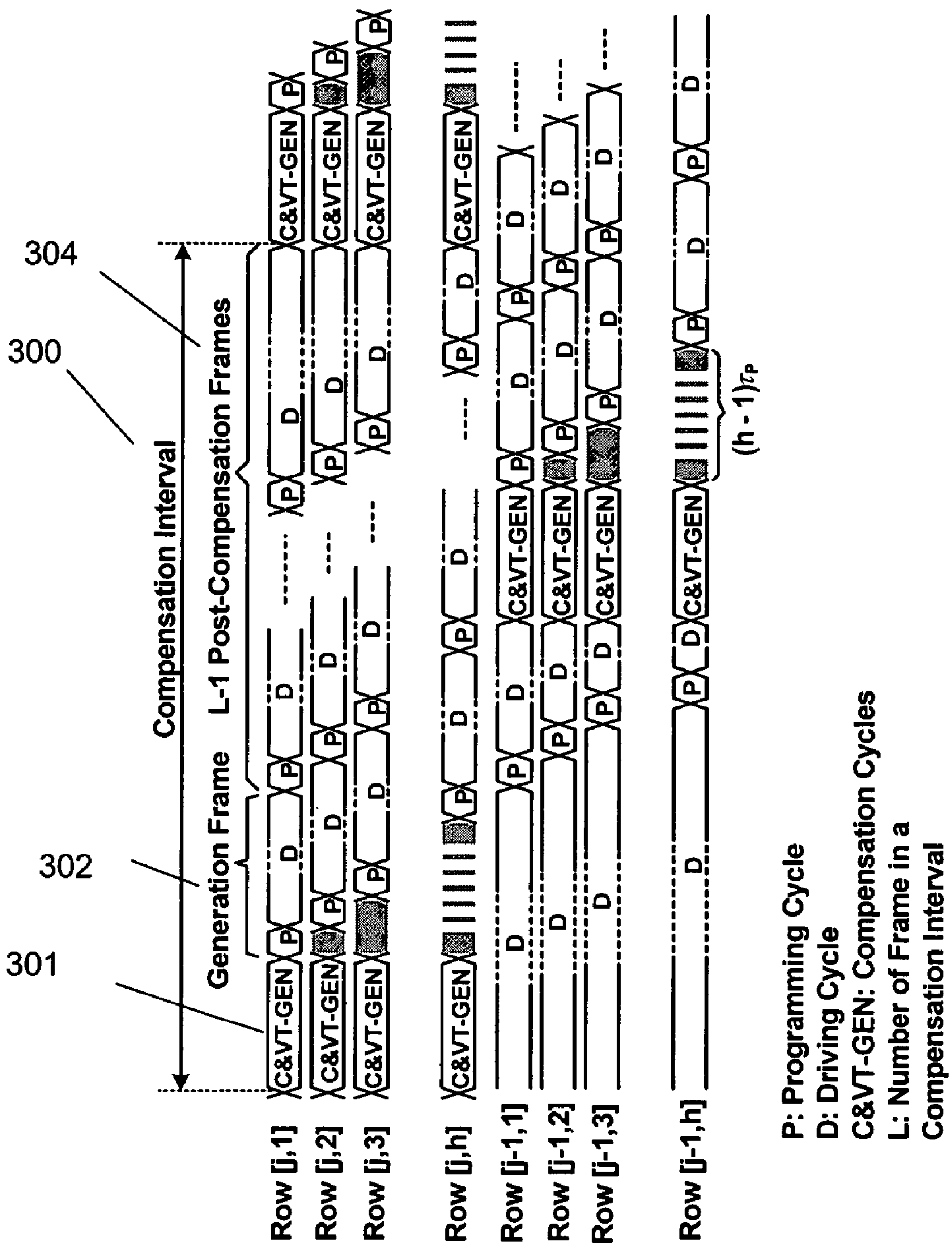
FIG. 9 illustrates an example of a shared signaling addressing scheme for a light emitting display, in accordance with an embodiment of the present invention.

FIG. 9 illustrates an example of the shared signaling addressing scheme for a light emitting light display, in accordance with an embodiment of the present invention. The shared signaling addressing scheme reduces the interface and driver complexity.

A display array to which the shared signaling addressing scheme is applied is divided into few segments, similar to those for FIGS. 2 and 3. In FIG. 9, "Row[j, k]" (k=1, 2, 3, . . . , h) represents the $k^{th}$ row in the $j^{th}$ segment, "h" is the number of row in each segment, and "L" is the number of frames that use the same generated $V_T$. In FIG. 9, "Row [j, k]" (k=1, 2, 3, . . . , h) is in a segment, and "Row [j−1, k]" (k=1, 2, 3, . . . , h) is in another segment.

The timing schedule of FIG. 9 includes compensation cycles "C & VT-GEN" (e.g. 301 of FIG. 9), a programming cycle "P", and a driving cycle "D". A compensation interval 300 includes a generation frame cycle 302 in which the threshold voltage of the drive TFT is generated and stored inside the pixel, compensation cycles "C & VT-GEN" (e.g. 301 of FIG. 9), besides the normal operation of the display, and L−1 post compensation frames cycles 304 which are the normal operation frame. The generation frame cycle 302 includes one programming cycle "P" and one driving cycle "D". The L−1 post compensation frames cycle 304 includes a set of the programming cycle "P" and the driving cycle "D", in series.

As shown in FIG. 9, the driving cycle of each row starts with a delay of $\tau_P$ from the previous row where $\tau_P$ is the timing budget assigned to the programming cycle "P". The timing of the driving cycle "D" at the last frame is reduced for each rows by $i*\tau_P$ where "i" is the number of rows before that row in the segment (e.g., (h−1) for Row [j, h]).

Figure 10:
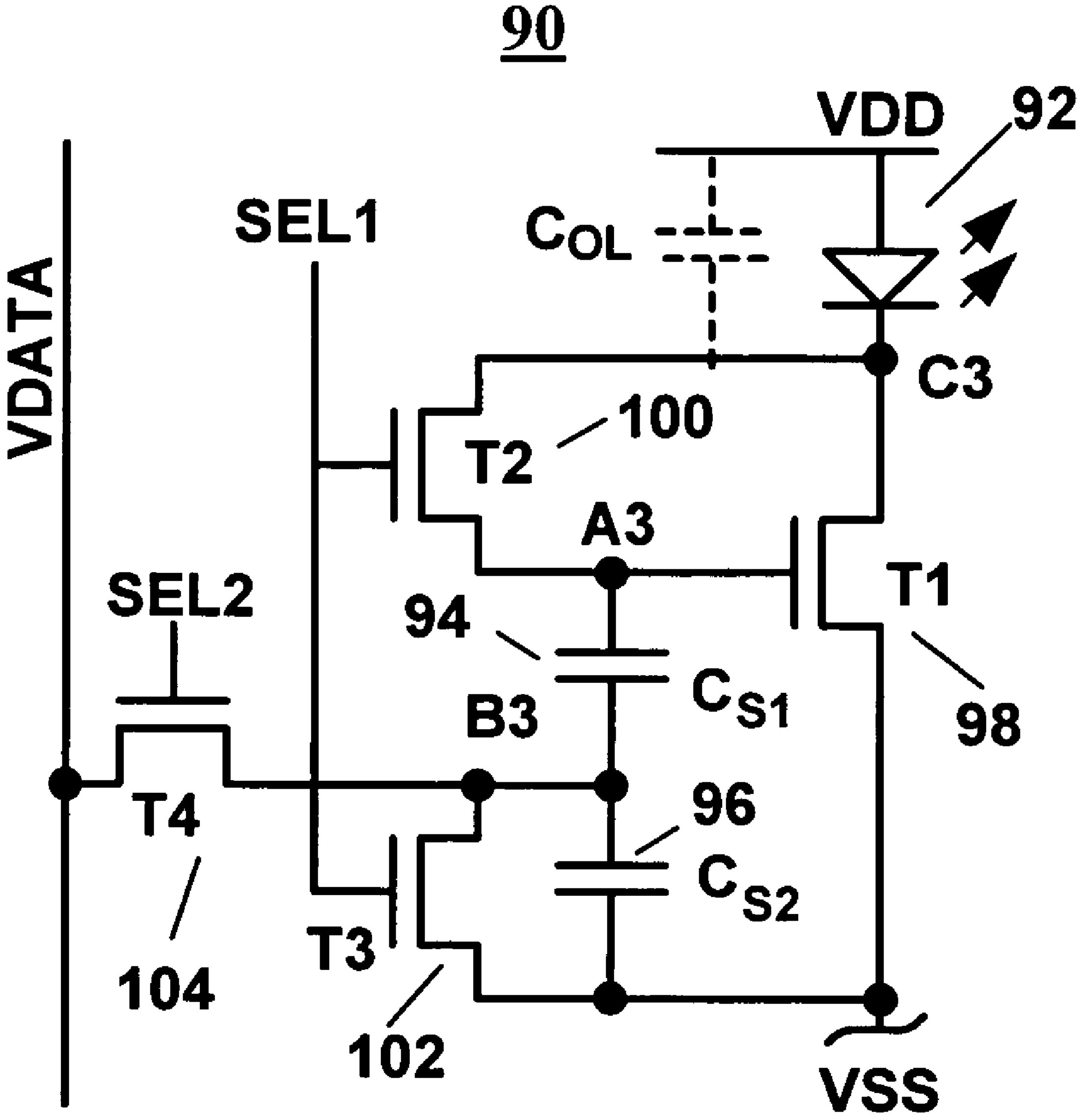
FIG. 10 illustrates an example of a pixel circuit to which the shared signaling addressing scheme is applicable.

Since $\tau_P$ (e.g., the order of 10 μs) is much smaller than the frame time (e.g., the order of 16 ms), the latency effect is negligible. However, to minimize this effect, the programming direction may be changed each time, so that the average brightness lost due to latency becomes equal for all the rows or takes into consideration this effect in the programming voltage of the frames before and after the compensation cycles. For example, the sequence of programming the row may be changed after each $V_T$-generation cycle (i.e., programming top-to-bottom and bottom-to-top iteratively), FIG. 10 illustrates an example of a pixel circuit to which the shared signaling addressing scheme is applicable. The pixel circuit 90 of FIG. 10 includes an OLED 92, storage capacitors 94 and 96, a drive TFT 98, and switch TFTs 100, 102 and 104. The pixel circuit 90 is similar to the pixel circuit 70 of FIG. 7. The drive TFT 98, the switch TFT 100, and the first storage capacitor 94 are connected at node A3. The switch TFTs 102 and 104, and the first and second storage capacitors 94 and 96 are connected at node B3. The OLED 92, the drive TFT 98 and the switch TFT 100 are connected at node C3. The switch TFT 102, the second storage capacitor 96, and the drive TFT 98 are connected to a controllable voltage supply VSS.

Figure 11:
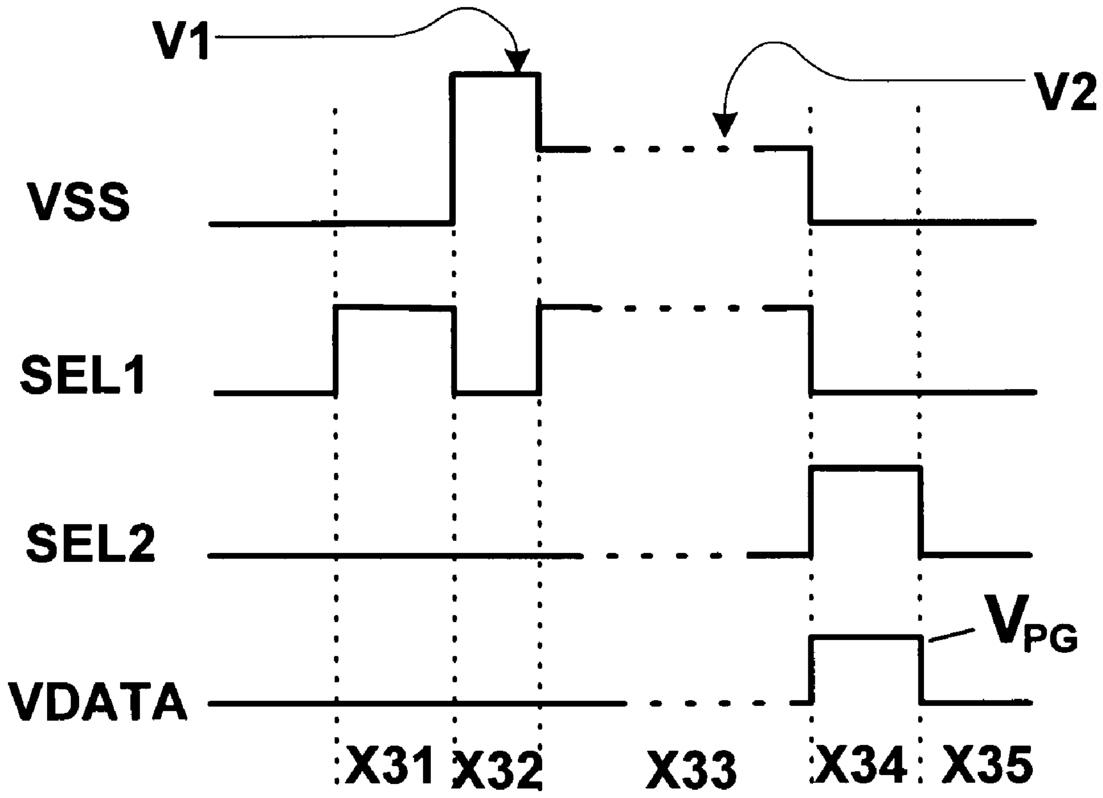
FIG. 11 illustrates an example of a timing schedule applied to the pixel circuit of FIG. 10.

FIG. 11 illustrates an example of a timing schedule applied to the pixel circuit 90. In FIG. 11, "X31", "X32", "X33", "X34", and "X35" represent operating cycles. X31, X32 and X33 correspond to the compensation cycles (e.g. 301 of FIG. 9), X34 corresponds to "P" of FIG. 9, and X35 correspond to "D" of FIG. 9.

Referring to FIGS. 10 and 11, the pixel circuit 90 employs a bootstrapping effect to add the programming voltage to the generated $V_T$ where $V_T$ is the threshold voltage of the drive TFT 98. The compensation cycles (e.g. 301 of FIG. 9) include the first three cycles X31, X32, and X33. During the first operating cycle X31, node A3 is charged to a compensation voltage, VDD−$V_{OLED}$. The timing of the first operating cycle X31 is small to control the effect of unwanted emission. During the second operating cycle X32, VSS goes to a high positive voltage V1 (for example, V1=20 V), and thus node A3 is bootstrapped to a high voltage, and also node C3 goes to V1, resulting in turning off the OLED 92. During the third operating cycle X33, the voltage at node A3 is discharged through the switch TFT 100 and the drive TFT 98 and settles to V2+$V_T$ where $V_T$ is the threshold voltage of the drive TFT 98, and V2 is, for example, 16 V. VSS goes to zero before the current-regulation cycle, and node A3 goes to $V_T$. A programming voltage $V_{PG}$ is added to the generated $V_T$ by bootstrapping during the fourth operating cycle X34. The current regulation occurs in the fourth operating cycle X34 during which node B3 is charged to the programming voltage $V_{PG}$ (for example, $V_{PG}$=6V). Thus the voltage at node A3 changes to $V_{PG}$+$V_T$ resulting in an overdrive voltage independent of $V_T$. The current of the pixel circuit during the fifth cycle X35 (driving cycle) becomes independent of $V_T$ shift. Here, the first storage capacitor 94 is used to store the $V_T$ during the $V_T$-generation interval.

Figure 12:
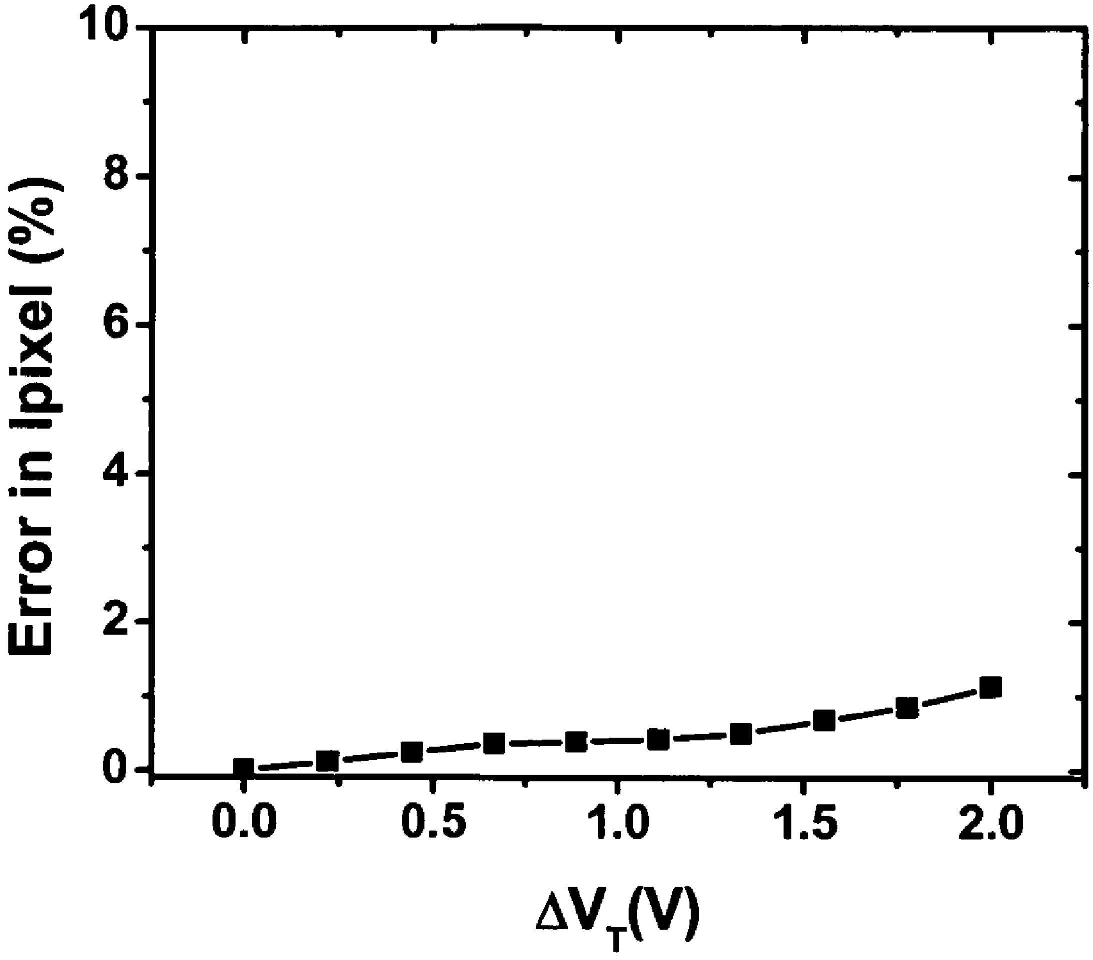
FIG. 12 illustrates the pixel current stability of the pixel circuit of FIG. 10.

FIG. 12 illustrates the pixel current stability of the pixel circuit 90 of FIG. 10. In FIG. 12, "$\Delta V_T$" represents the shift in the threshold voltage of the drive TFT (e.g., 98 of FIG. 10), and "Error in 1pixel (%)" represents the change in the pixel current causing by $\Delta V_T$ As shown in FIG. 12, the pixel circuit 90 of FIG. 10 provides a highly stable current even after a 2-V shift in the $V_T$ of the drive TFT.

Figure 13:
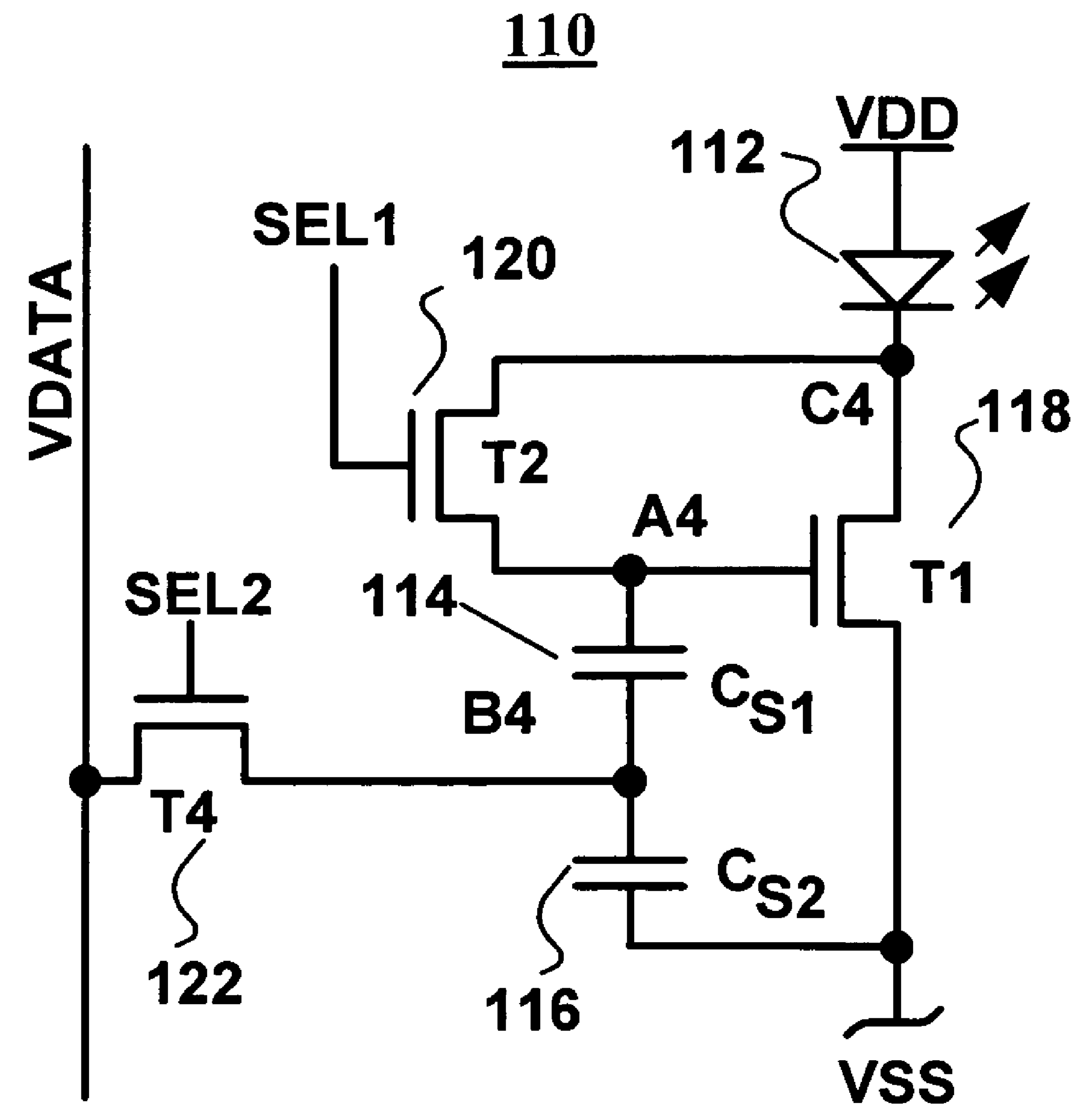
FIG. 13 illustrates another example of a pixel circuit to which the shared signaling addressing scheme is applicable.

FIG. 13 illustrates another example of a pixel circuit to which the shared signaling addressing scheme is applicable. The pixel circuit 110 of FIG. 13 is similar to the pixel circuit 90 of FIG. 10, and, however, includes two switch TFTs. The pixel circuit 110 includes an OLED 112, storage capacitors 114 and 116, a drive TFT 118, and switch TFTs 120 and 122. The drive TFT 118, the switch TFT 120, and the first storage capacitor 114 are connected at node A4. The switch TFTs 122 and the first and second storage capacitors 114 and 116 are connected at node B4. The cathode of the OLED 112, the drive TFT 118 and the switch TFT 120 are connected to node C4. The second storage capacitor 116 and the drive TFT 118 are connected to a controllable voltage supply VSS.

Figure 14:
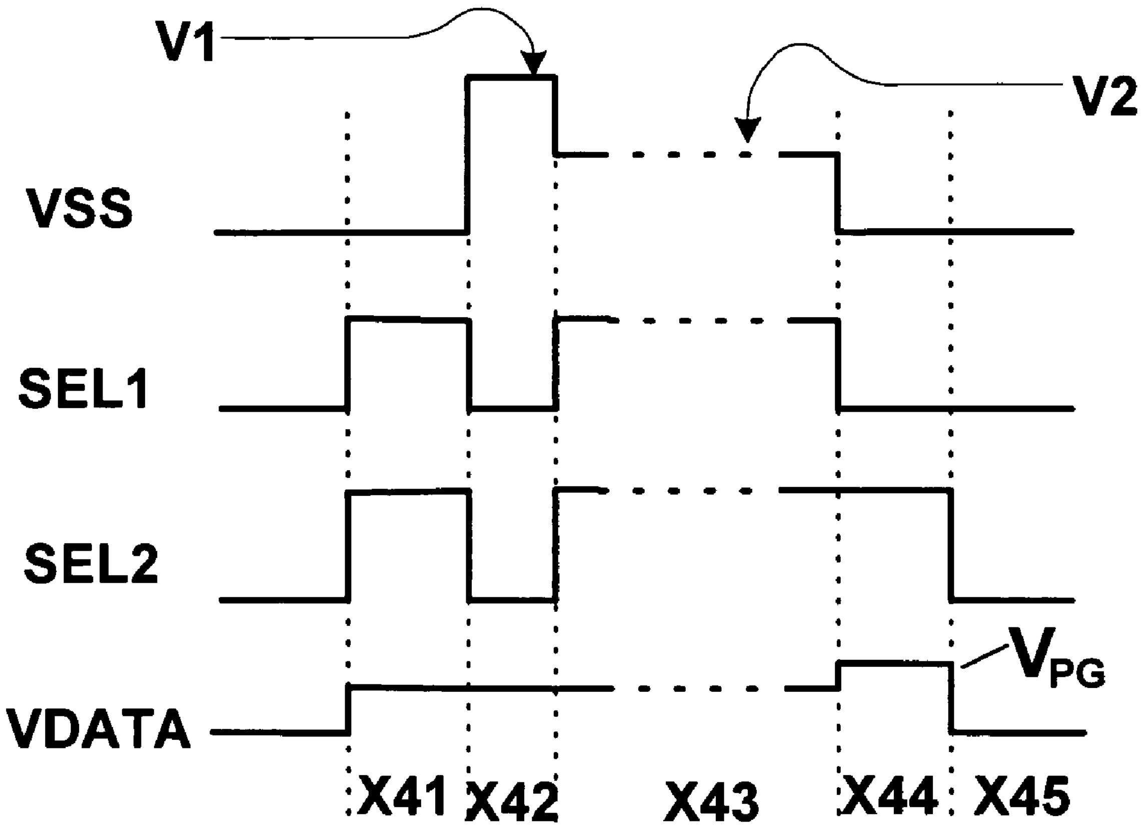
FIG. 14 illustrates an example of a timing schedule applied to the pixel circuit of FIG. 13.
Figure 15:
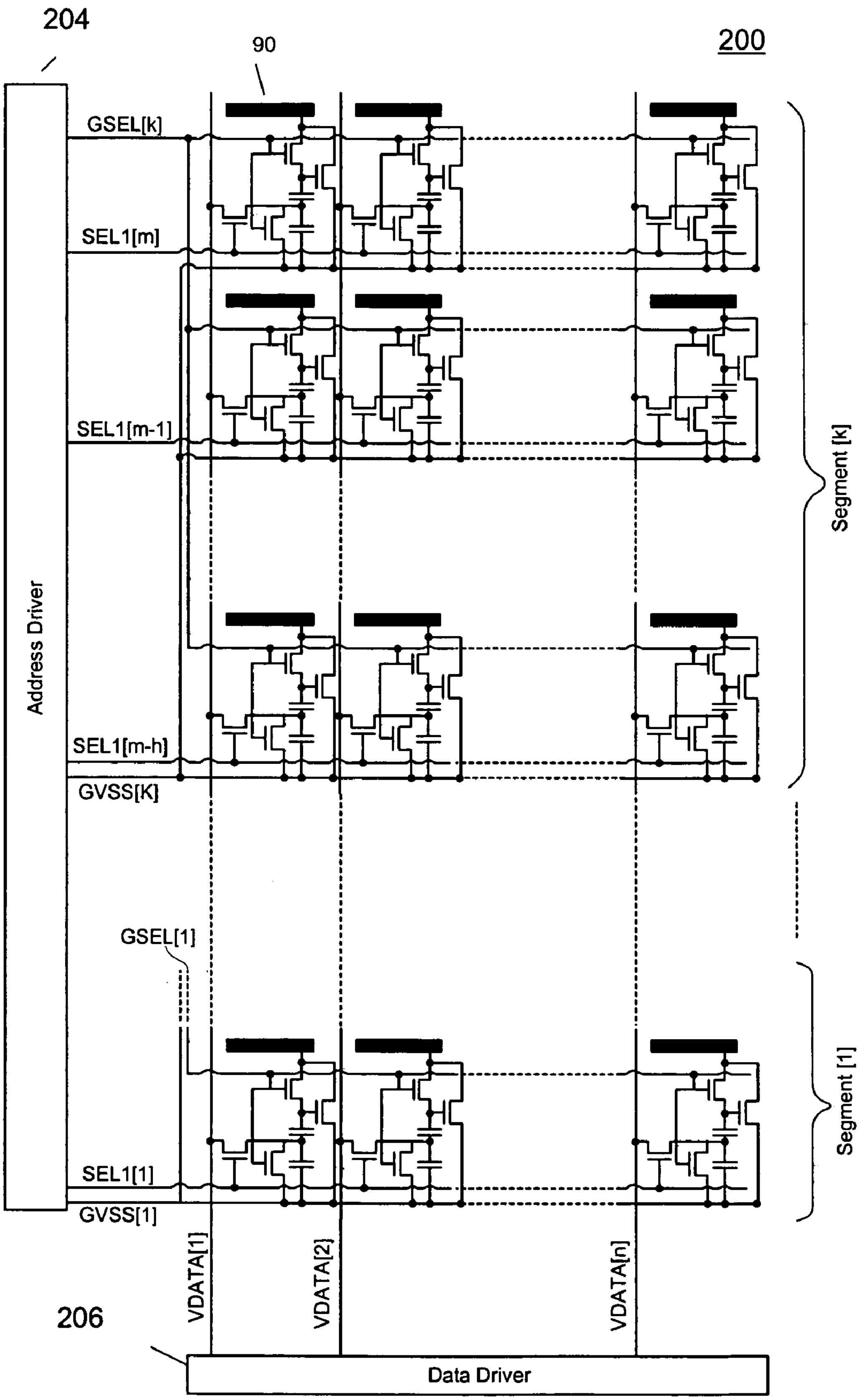
FIG. 15 illustrates an example of an AMOLED display array structure for the pixel circuit of FIG. 10.

FIG. 14 illustrates an example of a timing schedule applied to the pixel circuit 110. In FIG. 15, "X41", "X42", "X43", "X44", and "X44" represent operating cycles. X41, X42, and X43 correspond to compensation cycles (e.g. 301 of FIG. 9), X44 correspond to "P" of FIG. 9, and X45 correspond to "D" of FIG. 9.

Referring to FIGS. 13 and 14, the pixel circuit 110 employs a bootstrapping effect to add the programming voltage to the generated $V_T$. The compensation cycles (e.g. 301 of FIG. 9) include the first three cycles X41, X42, and X43. During the first operating cycle X41, node A4 is charged to a compensation voltage, VDD−$V_{OLED}$. The timing of the first operating cycle X41 is small to control the effect of unwanted emission. During the second operating cycle X42, VSS goes to a high positive voltage V1 (for example, V1=20 V), and so node A4 is bootstrapped to a high voltage, and also node C4 goes to V1, resulting in turning off the OLED 112. During the third operating cycle X43, the voltage at node A4 is discharged through the switch TFT 120 and the drive TFT 118 and settles to V2+$V_T$ where $V_T$ is the threshold voltage of the drive TFT 118 and V2 is, for example, 16 V. VSS goes to zero before the current-regulation cycle, and thus node A4 goes to $V_T$. A programming voltage $V_{PG}$ is added to the generated $V_T$ by bootstrapping during the fourth operating cycle X44. The current regulation occurs in the fourth operating cycle X44 during which node B4 is charged to the programming voltage $V_{PG}$ (for example, $V_{PG}$=6 V). Thus the voltage at node A4 changes to $V_{PG}+V_T$ resulting in an overdrive voltage independent of $V_T$. The current of the pixel circuit during the fifth cycle X45 (driving cycle) becomes independent of $V_T$ shift. Here, the first storage capacitor 114 is used to store the $V_T$ during the $V_T$-generation interval.

FIG. 15 illustrates an example of an AMOLED display structure for the pixel circuit of FIG. 10. In FIG. 15, GSEL[a] (a=1, . . . , k) corresponds to SEL2 of FIG. 10, SEL1[b] (b=1, . . . , m) corresponds to SEL1 of FIG. 10, GVSS[c] (c=1, . . . , k) corresponds to VSS of FIG. 10, VDATA[d] (d=1, . . . , n) corresponds to VDATA of FIG. 10. The AMOLED display 200 of FIG. 15 includes a plurality of pixel circuits 90 which are arranged in row and column, an address driver 204 for controlling GSEL[a], SEL1[b] and GVSS[c], and a data driver 206 for controlling VDATA[s]. The rows of the pixel circuits 90 are segmented as described above. In FIG. 15, segment [1] and segment [k] are shown as examples.

Referring to FIGS. 10 and 15, SEL2 and VSS signals of the rows in one segment are connected together and form GSEL and GVSS signals.

Figure 16:
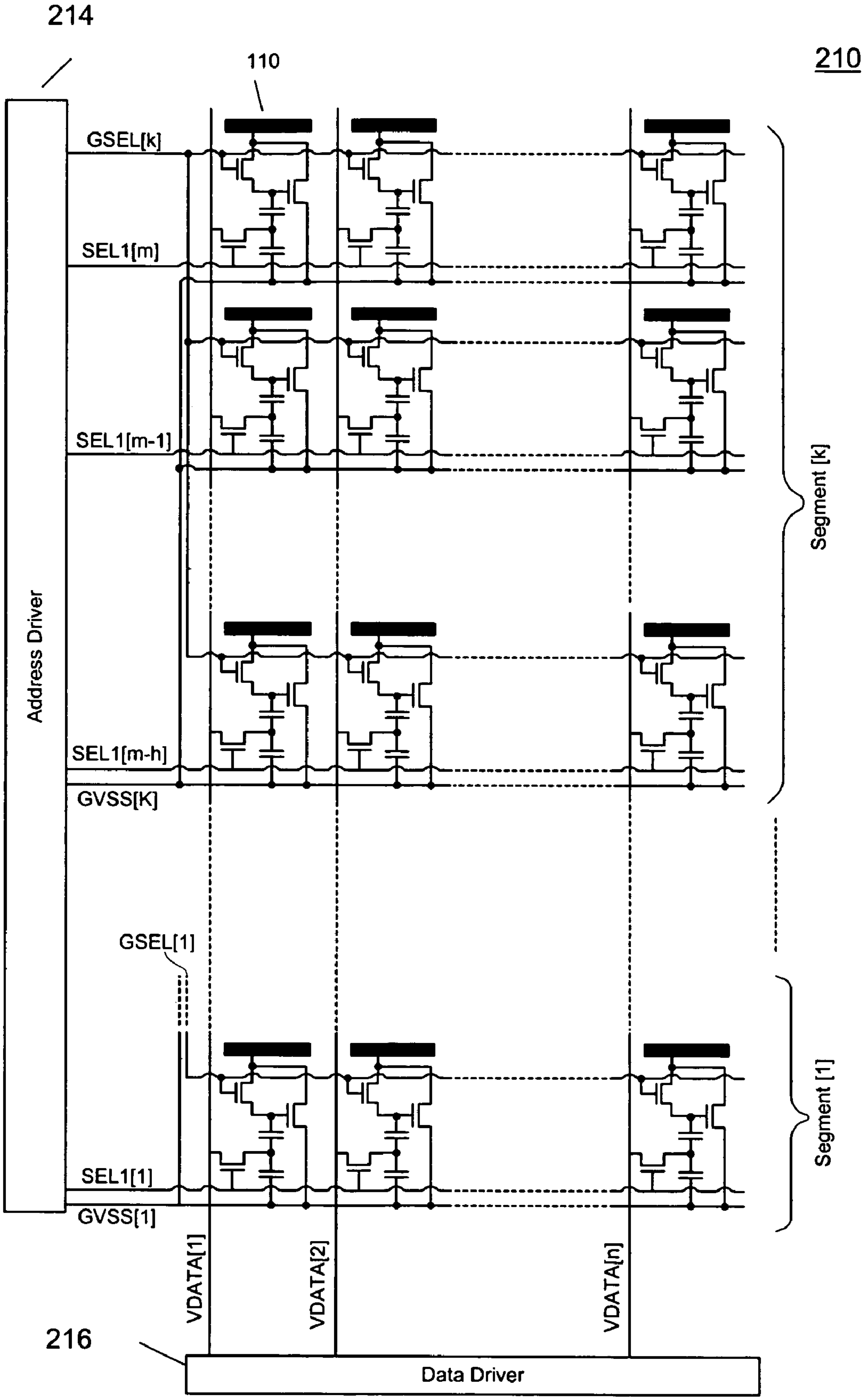
FIG. 16 illustrates an example of an AMOLED display array structure for the pixel circuit of FIG. 13.
Figure 17:
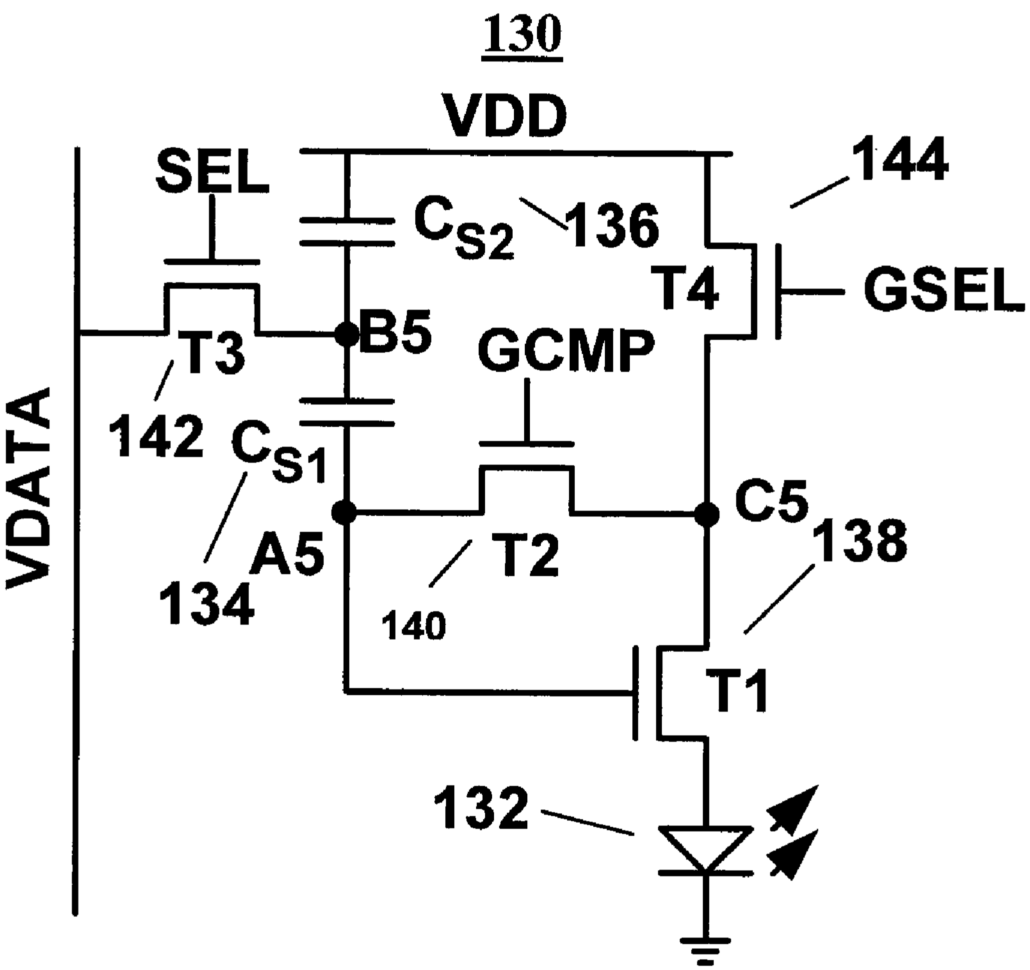
FIG. 17 illustrates a further example of a pixel circuit to which the shared signaling addressing scheme is applicable.

FIG. 16 illustrates an example of an AMOLED display structure for the pixel circuit of FIG. 14. In FIG. 17, GSEL[a] (a=1, . . . , k) corresponds to SEL2 of FIG. 14, SEL1[b] (b=1, . . . , m) corresponds to SEL1 of FIG. 14, GVSS[c] (c=1, . . . , k) corresponds to VSS of FIG. 14, VDATA[d] (d=1, . . . , n) corresponds to VDATA of FIG. 14. The AMOLED display 210 of FIG. 16 includes a plurality of pixel circuits 110 which are arranged in row and column, an address driver 214 for controlling GSEL[a], SEL1[b] and GVSS[c], and a data driver 216 for controlling VDATA[s]. The rows of the pixel circuits 110 are segmented as described above. In FIG. 15, segment [1] and segment [k] are shown as examples.

Referring to FIGS. 14 and 16, SEL2 and VSS signals of the rows in one segment are connected together and form GSEL and GVSS signals.

Referring to FIGS. 15 and 16, the display arrays can diminish its area by sharing VSS and GSEL signals between physically adjacent rows. Moreover, GVSS and GSEL in the same segment are merged together and form the segment GVSS and GSEL lines. Thus, the controlling signals are reduced. Further, the number of blocks driving the signals is also reduced resulting in lower power consumption and lower implementation cost.

FIG. 17 illustrates a further example of a pixel circuit to which the shared signaling addressing scheme is applicable. The pixel circuit of FIG. 17 includes an OLED 132, storage capacitors 134 and 136, a drive TFT 138, and switch TFTs 140, 142 and 144. A first select line SEL is connected to the gate terminal of the switch TFT 142. A second select line GSEL is connected to the gate terminal of the switch TFT 144. A GCOMP signal line is connected to the gate terminal of the switch TFT 140. The first terminal of the switch TFT 140 is connected to node A5, and the second terminal of the switch TFT 140 is connected to node C5. The first terminal of the drive TFT 138 is connected to node C5 and the second terminal of the drive TFT 138 is connected to the anode of the OLED 132. The first terminal of the switch TFT 142 is connected to a data line VDATA, and the second terminal of the switch TFT 142 is connected to node B5. The first terminal of the switch TFT 144 is connected to a voltage supply VDD, and the second terminal of the switch TFT 144 is connected to node C5. The first terminal of the first storage capacitor 134 is connected to node A5, and the second terminal of the first storage capacitor 134 is connected to node B5. The first terminal of the second storage capacitor 136 is connected to node B5, and the second terminal of the second storage capacitor 136 is connected to VDD.

Figure 18:
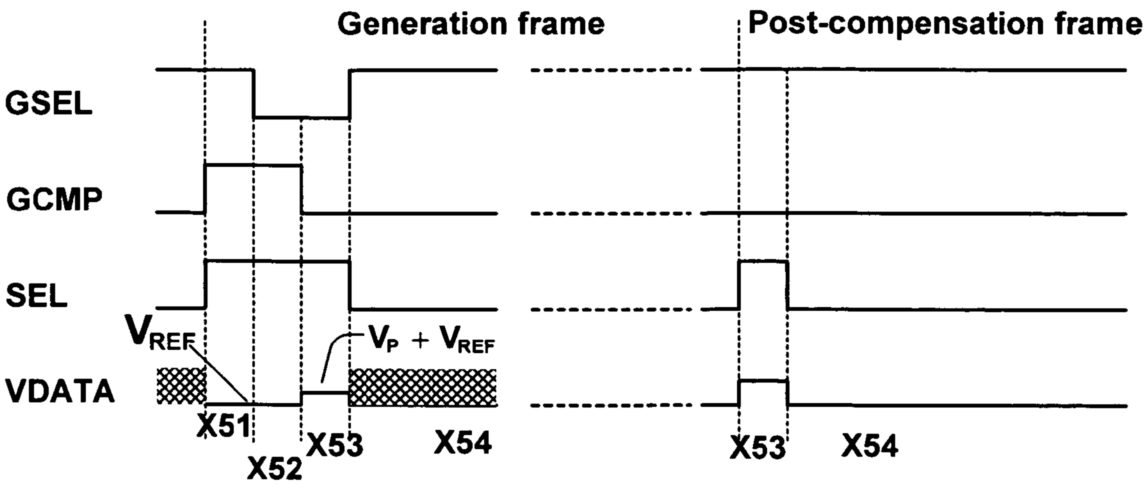
FIG. 18 illustrates an example of a timing schedule applied to the pixel circuit of FIG. 17.

FIG. 18 illustrates an example of a timing schedule applied to the pixel circuit 130. In FIG. 18, operating cycles X51, X52, X53, and X54 form a generating frame cycle (e.g., 302 of FIG. 9), the second operating cycles X53 and X54 form a post-compensation frame cycle (e.g., 304 of FIG. 9). X53 and X54 are the normal operation cycles whereas the rest are the compensation cycles.

Referring to FIGS. 17 and 18, the pixel circuit 130 employs bootstrapping effect to add a programming voltage to the generated $V_T$ where $V_T$ is the threshold voltage of the drive TFT 138. The compensation cycles (e.g. 301 of FIG. 9) include the first two cycles X51 and X52. During the first operating cycle X51, node A5 is charged to a compensation voltage, and node B5 is charged to $V_{REF}$ through the switch TFT 142 and VDATA. The timing of the first operating cycle X51 is small to control the effect of unwanted emission. During the second operating cycle X52, GSEL goes to zero and thus it turns off the switch TFT 144. The voltage at node A5 is discharged through the switch TFT 140 and the drive TFT 138 and settles to $V_{OLED}+V_T$ where $V_{OLED}$ is the voltage of the OLED 132, and $V_T$ is the threshold voltage of the drive TFT 138. During the programming cycle, i.e., the third operating cycle X53, node B5 is charged to $V_P+V_{REF}$ where $V_P$ is a programming voltage. Thus the gate voltage of the drive TFT 138 becomes $V_{OLED}+V_T+V_P$. Here, the first storage capacitor 134 is used to store the $V_T+V_{OLED}$ during the compensation interval.

Figure 19:
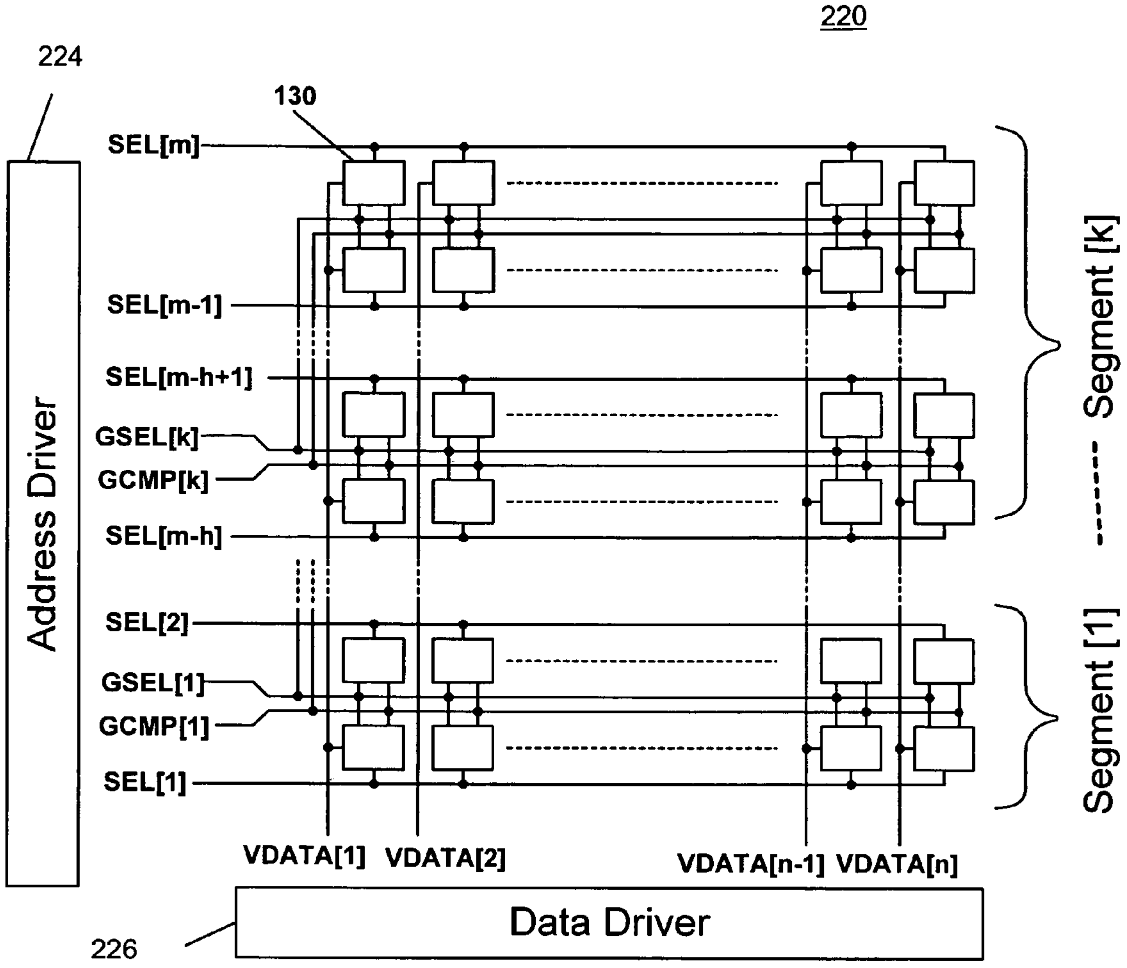
FIG. 19 illustrates an example of an AMOLED display array structure for the pixel circuit of FIG. 17.

FIG. 19 illustrates an example of an AMOLED display array structure for the pixel circuit 130 of FIG. 17. In FIG. 19, GSEL[a] (a=1, . . . , k) corresponds to GSEL of FIG. 17, SEL[b] (b=1, . . . , m) corresponds to SEL1 of FIG. 17, GCMP[c] (c=1, . . . , k) corresponds to GCOMP of FIG. 17, VDATA[d] (d=1, . . . , n) corresponds to VDATA of FIG. 17. The AMOLED display 220 of FIG. 19 includes a plurality of pixel circuits 130 which are arranged in row and column, an address driver 224 for controlling SEL[a], GSEL[b], and GCOMP[c], and a data driver 226 for controlling VDATA[c]. The rows of the pixel circuits 130 are segmented (e.g., segment [1] and segment [k]) as described above.

As shown in FIGS. 17 and 19, GSEL and GCOMP signals of the rows in one segment are connected together and form GSEL and GCOMP lines. GSEL and GCOMP signals are shared in the segment. Moreover, GVSS and GSEL in the same segment are merged together and form the segment GVSS and GSEL lines. Thus, the controlling signals are reduced. Further, the number of blocks driving the signals is also reduced resulting in lower power consumption and lower implementation cost.

Figure 20:
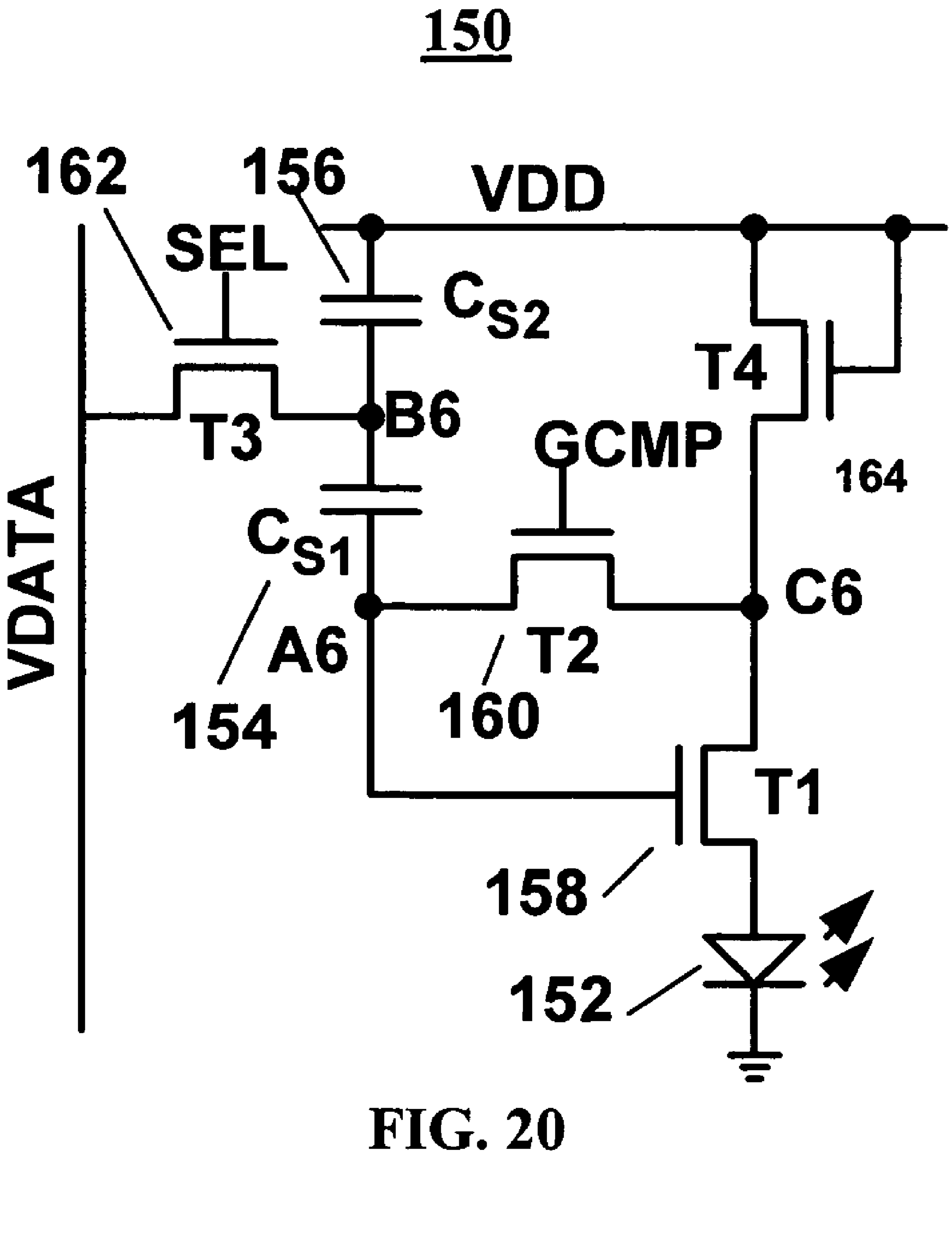
FIG. 20 illustrates a further example of a pixel circuit to which the shared signaling addressing scheme is applicable.

FIG. 20 illustrates a further example of a pixel circuit to which the shared addressing scheme is applicable. The pixel circuit 150 of FIG. 20 is similar to the pixel circuit 130 of FIG. 17. The pixel circuit 150 includes an OLED 152, storage capacitors 154 and 156, a drive TFT 158, and switch TFTs 160, 162, and 164. The gate terminal of the switch TFT 164 is connected to a controllable voltage supply VDD, rather than GSEL. The drive TFT 158, the switch TFT 162 and the first storage capacitor 154 are connected at node A6. The switch TFT 162 and the first and second storage capacitors 154 and 156 are connected at node B6. The drive TFT 158 and the switch TFTs 160 and 164 are connected to node C6.

Figure 21:
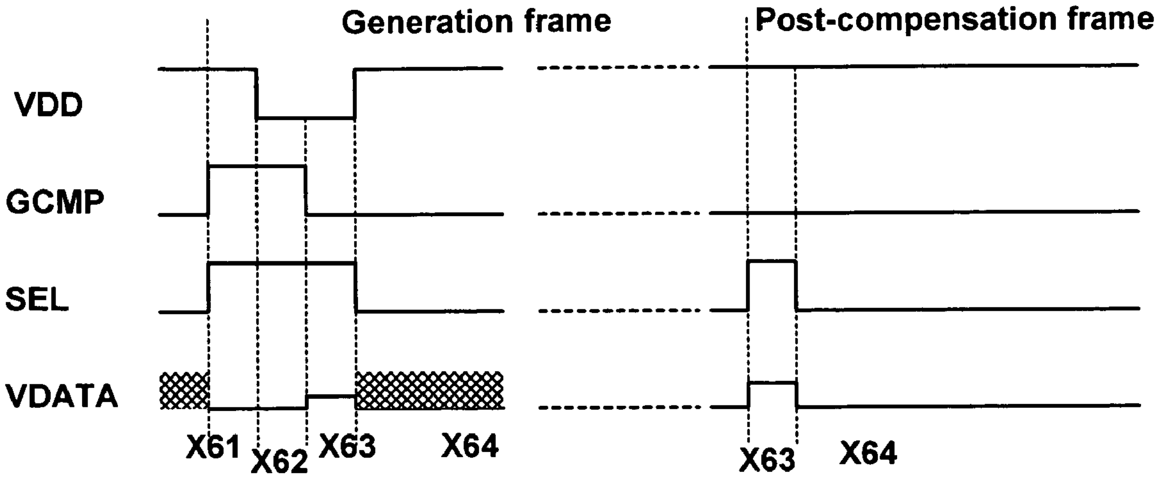
FIG. 21 illustrates an example of a timing schedule applied to the pixel circuit of FIG. 20.

FIG. 21 illustrates an example of a timing schedule applied to the pixel circuit 150. In FIG. 21, operating cycles X61, X62, X63, and X64 form a generating frame cycle (e.g., 302 of FIG. 9), the second operating cycles X63 and X64 form a post-compensation frame cycle (e.g., 304 of FIG. 9).

Referring to FIGS. 20 and 21, the pixel circuit 150 employs bootstrapping effect to add a programming voltage to the generated $V_T$ where $V_T$ is the threshold voltage of the drive TFT 158. The compensation cycles (e.g. 301 of FIG. 9) include the first two cycles X61 and X62. During the first operating cycle X61, node A6 is charged to a compensation voltage, and node B6 is charged to $V_{REF}$ through the switch TFT 162 and VDATA. The timing of the first operating cycle x61 is small to control the effect of unwanted emission. During the second operating cycle x62, VDD goes to zero and thus it turns off the switch TFT 164. The voltage at node A6 is discharged through the switch TFT 160 and the drive TFT 158 and settles to $V_{OLED}+V_T$ where $V_{OLED}$ is the voltage of the OLED 152, and $V_T$ is the threshold voltage of the drive TFT 158. During the programming cycle, i.e., the third operating cycle x63, node B6 is charged to $V_P+V_{REF}$ where $V_P$ is a programming voltage. It has been identified Thus the gate voltage of the drive TFT 158 becomes $V_{OLED}+V_T+V_P$. Here, the first storage capacitor 154 is used to store the $V_T+V_{OLED}$ during the compensation interval.

Figure 22:
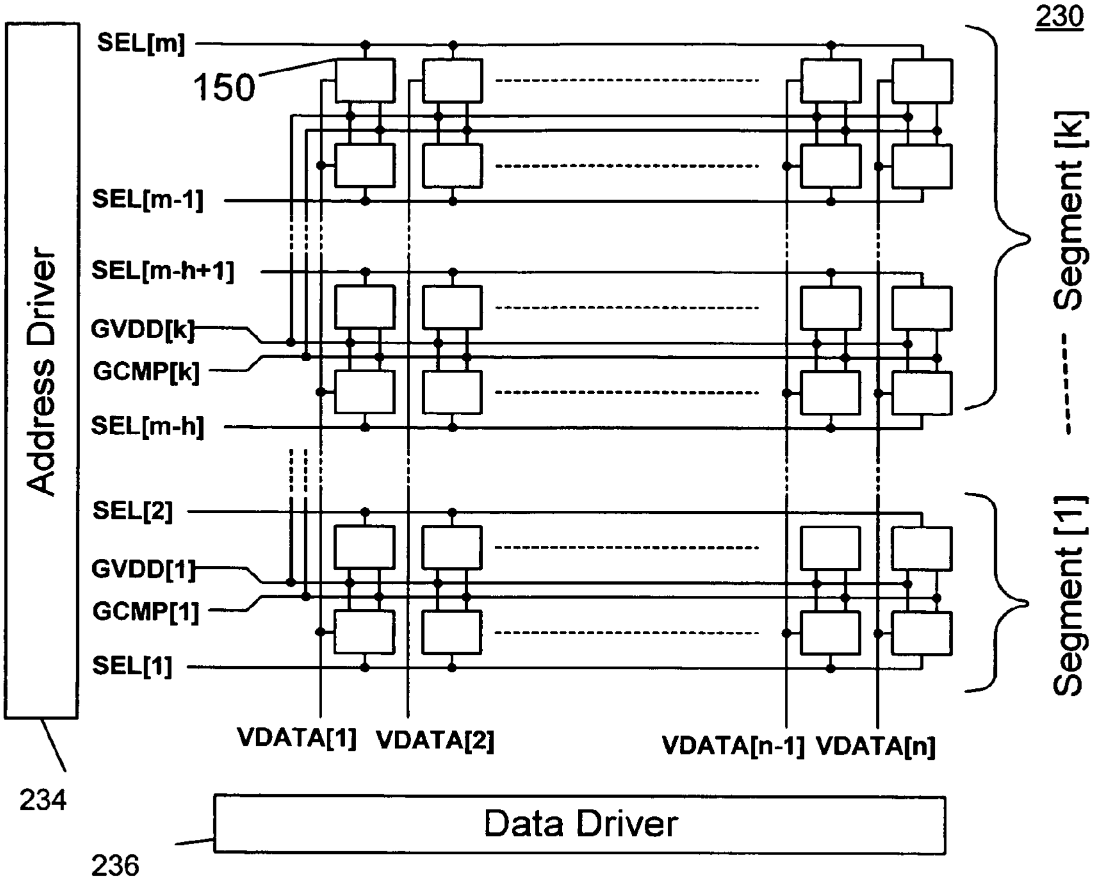
FIG. 22 illustrates an example of an AMOLED display array structure for the pixel circuit of FIG. 20.

FIG. 22 illustrates an example of an AMOLED display array structure for the pixel circuit 150 of FIG. 20. In FIG. 22, SEL[a] (a=1, . . . , m) corresponds to SEL of FIG. 22, GCMP [b] (b=1, . . . , K) corresponds to GCOMP of FIG. 22, GVDD [c] (c=1, . . . , k) corresponds to VDD of FIG. 22, and VDATA [d] (d=1, . . . , n) corresponds to VDATA of FIG. 22. The AMOLED display 230 of FIG. 22 includes a plurality of pixel circuits 150 which are arranged in row and column, an address driver 234 for controlling SEL[a], GCOMP[b], and GVDD[c], and a data driver 236 for controlling VDATA[c]. The rows of the pixel circuits 230 are segmented (e.g., segment [1] and segment [k]) as described above.

Referring to FIGS. 20 and 22, VDD and GCOMP signals of the rows in one segment are connected together and form GVDD and GCOMP lines. GVDD and GCOMP signals are shared in the segment. Moreover, GVDD and GCOMP in the same segment are merged together and form the segment GVDD and GCOMP lines. Thus, the controlling signals are reduced. Further, the number of blocks driving the signals is also reduced resulting in lower power consumption and lower implementation cost.

According to the embodiments of the present invention, the operating cycles are shared in a segment to generate an accurate threshold voltage of the drive TFT. It reduces the power consumption and signals, resulting in lower implementation cost. The operating cycles of a row in the segment are overlapped with the operating cycles of another row in the segment. Thus, they can maintain high display speed, regardless of the size of the display.

The accuracy of the generated VT depends on the time allocated to the $V_T$-generation cycle. The generated $V_T$ is a function of the storage capacitance and drive TFT parameters, as a result, the special mismatch affects the generated VT associated within the mismatch in the storage capacitor for a given threshold voltage of the drive transistor. Increasing the time of the $V_T$-generation cycle reduces the effect of special mismatch on the generated $V_T$. According to the embodiments of the present invention, the timing assigned to $V_T$ is extendable without either affecting the frame rate or reducing the number of rows, thus, it is capable of reducing the imperfect compensation and spatial mismatch effect, regardless of the size of the panel.

The $V_T$-generation time is increased to enable high-precision recovery of the threshold voltage $V_T$ of the drive TFT across its gate-source terminals. As a result, the uniformity over the panel is improved. In addition, the pixel circuits for the addressing schemes have the capability of providing a predictably higher current as the pixel ages and so as to compensate for the OLED luminance degradation.

According to the embodiments of the present invention, the addressing schemes improve the backplane stability, and also compensate for the OLED luminance degradation. The overhead in power consumption and implementation cost is reduced by over 90% compared to the existing compensation driving schemes.

Since the shared addressing scheme ensures the low power consumption, it is suitable for low power applications, such as mobile applications. The mobile applications may be, but not limited to, Personal Digital Assistants (PDAs), cell phones, etc.

All citations are hereby incorporated by reference.

The present invention has been described with regard to one or more embodiments. However, it will be apparent to persons skilled in the art that a number of variations and modifications can be made without departing from the scope of the invention as defined in the claims.

What is claimed is:

1. A display system comprising:

a pixel array including a plurality of pixel circuits arranged in rows and columns, each pixel circuit having a light emitting device, a capacitor, a switch transistor, and a drive transistor for driving the light emitting device, the rows being divided into a plurality of segments;

a driver for generating and storing an aging factor of each pixel circuit in a segment into the corresponding pixel circuit in a first cycle, by using a segment line shared by the segment, and in subsequent cycles programming and driving each row in the segment based on the stored aging factor such that the driving cycle of each row starts with a delay from a previous row, the delay being a timing budget assigned to the programming.

2. A display system as claimed in claim 1, wherein the sequence of programming rows in the segment is changeable under the control of the driver.

3. A display system as claimed in claim 2, wherein a compensation interval is assigned to each segment for displaying, the compensation interval including a compensation cycle, a generation frame cycle for generating the aging factor, and a post compensation frames cycles for normal operation based on the aging factor generated in the generation frame cycle, the post compensation frames cycles having (L−1) cycles where L represents the number of frames in the compensation interval.

4. A display system as claimed in claim 1, wherein the capacitor includes a first capacitor and a second capacitor, the switch transistor includes a first switch transistor, a second switch transistor and a third switch transistor, the gate terminals of the first and second switch transistors being connected to a first select line, the gate terminal of the third switch transistor being connected to a second select line, the first and second select lines being driven by the driver, the first terminal of the third switch transistor being connected to a data line driven by the driver, the second terminal of the third switch transistor being connected to the first and second capacitors, the first terminal of the second switch transistor being connected to the first and second capacitors, the second terminal of the second switch transistor being connected to a controllable voltage line driven by the driver, the first terminal of the first switch transistor being connected to the first terminal of the drive transistor and the light emitting device, and the second terminal of the first switch transistor being connected to the gate terminal of the drive transistor, the first and second capacitors being connected to the gate terminal of the drive transistor and the controllable voltage line in series, the second terminal of the drive transistor being connected to the controllable voltage line.

5. A display system as claimed in claim 1, wherein the capacitor includes a first capacitor and a second capacitor, the switch transistor includes a first switch transistor and a second switch transistor, the gate terminal of the first switch transistor being connected to a first select line, the gate terminal of the second switch transistor being connected to a second select line, the first and second select lines being driven by the driver, the first terminal of the second switch transistor being connected to a data line driven by the driver, the second terminal of the second switch transistor being connected to the first and second capacitors, the first terminal of the first switch transistor being connected to the first terminal of the drive transistor and the light emitting device, the second terminal of the first switch transistor being connected to the gate terminal of the drive transistor, the first and second capacitors being connected to the gate terminal of the drive transistor and a controllable voltage line driven by the driver in series, the second terminal of the drive transistor being connected to the controllable voltage line.

6. A display system as claimed in claim 1, wherein the capacitor includes a first capacitor and a second capacitor, the switch transistor includes a first switch transistor, a second switch transistor and a third switch transistor, the gate terminal of the first switch transistor being connected to a signal line, the gate terminal of the second switch transistor being connected to a first select line, the gate terminal of the third switch transistor being connected to a second select line, the first and second select lines and the signal line being driven by the driver, the first terminal of the first transistor being connected to the first capacitor, the second terminal of the first switch transistor being connected to the first terminal of the drive transistor, the first terminal of the second switch transistor being connected to a data line driven by the driver, the second terminal of the second switch transistor being connected to the first and second capacitors, the first terminal of the third switch transistor being connected to the first terminal of the drive transistor, the first and second capacitors being connected to the gate terminal of the drive transistor in series.

7. A display system as claimed in claim 6, wherein the second capacitor, the second terminal of the third switch transistor and the second select line are connected to a controllable voltage line.

8. A method of driving a display system comprising a pixel array including a plurality of pixel circuits arranged in rows and columns, the pixel circuit having a light emitting device, a capacitor, a switch transistor and a drive transistor for driving the light emitting device, the rows being divided into a plurality of segments, the method comprising the steps of:

in a first cycle, generating an aging factor of each pixel circuit in a segment and storing the aging factor into the corresponding pixel circuit, including operating on a segment line shared by the segment; and in subsequent cycles, programming and driving each row in the segment based on the corresponding stored aging factor such that the driving cycle of each row starts with a delay from a pervious row, the delay being a timing budget assigned to the programming.

9. A method as claimed in claim 8, further comprising the step of changing the sequence of programming rows in the segment.

10. A method as claimed in claim 9, wherein a compensation interval is assigned to each segment for displaying, the compensation interval including a compensation cycle, a generation frame cycle for generating the aging factor, and a post compensation frames cycles for normal operation using the aging factor generated in the generation frame cycle, the post compensation frames cycles having (L−1) cycles where L represents the number of frames in the compensation interval.

11. A display system as claimed in claim 1, wherein at least one of the transistors is fabricated using amorphous silicon, nano/micro crystalline silicon, poly silicon, organic semiconductor including organic transistor, NMOS/PMOS technology or CMOS technology including MOSFET, a p-type material or n-type material.

12. A display system as claimed in claim 4, wherein the segment line includes the controllable voltage line.

13. A display system as claimed in claim 5, wherein the segment line includes the controllable voltage line.

14. A display system as claimed in claim 6, wherein the segment line includes at least one of the signal line and the second select line.

15. A display system as claimed in claim 7, wherein the segment line includes at least one of the signal line, the second select line and the controllable voltage line.

16. A method as claimed in claim 8, comprising driving each row in the segment, wherein for each segment, the step of programming and the step of driving are repeatedly implemented after the first cycle.

* * * * *